United States Patent
Miki et al.

(10) Patent No.: US 11,481,752 B2
(45) Date of Patent: Oct. 25, 2022

(54) COMMODITY PURCHASE SYSTEM AND RELAY SERVER

(71) Applicant: TOSHIBA TEC KABUSHIKI KAISHA, Tokyo (JP)

(72) Inventors: Takahiro Miki, Yokohama Kanagawa (JP); Atsushi Nakamoto, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/408,203

(22) Filed: Aug. 20, 2021

(65) Prior Publication Data
US 2022/0092574 A1  Mar. 24, 2022

(30) Foreign Application Priority Data
Sep. 24, 2020  (JP) .............................. JP2020-159715

(51) Int. Cl.
*G06Q 20/20* (2012.01)
*G06Q 20/08* (2012.01)

(52) U.S. Cl.
CPC ......... *G06Q 20/208* (2013.01); *G06Q 20/085* (2013.01)

(58) Field of Classification Search
CPC ... G06Q 20/208; G06Q 20/085; G07G 1/0036
See application file for complete search history.

(56) References Cited

U.S. PATENT DOCUMENTS

| | | | | |
|---|---|---|---|---|
| 9,984,408 | B1 * | 5/2018 | Wong | ..................... G06Q 30/06 |
| 10,445,791 | B2 * | 10/2019 | Taylor | .................. G05D 1/0234 |
| 2012/0265651 | A1 * | 10/2012 | Ephraim | ............ G06Q 30/0623 |
| | | | | 705/27.2 |

(Continued)

FOREIGN PATENT DOCUMENTS

| | | | | |
|---|---|---|---|---|
| CA | 2949306 | A1 * | 5/2018 | ............ B25J 11/008 |
| JP | 2003-196497 | A | 7/2003 | |

OTHER PUBLICATIONS

Hrab, Neil. "Pointing Back At Poindexter". Retrieved from <http://wearcam.org/sousveillance_reasononline_free_minds_free_markets_nh123002.htm>. Originally published Dec. 2002. (Year: 2002).*

(Continued)

*Primary Examiner* — Nathan A Mitchell
(74) *Attorney, Agent, or Firm* — Kim & Stewart LLP

(57) ABSTRACT

A commodity purchase system for assisting a customer not in a store in making a purchase includes a relay server, a first terminal, and second terminal. The first terminal captures an image of commodities in the store, and the second terminal displays the image and detects a user selection operation at a position in the image, and then issues a scan request with information indicating a position in the image at which the selection operation was been made. Upon receipt of the scan request, the first terminal, display the image on which the selection operation was made with the position of the selection operation being marked in the image. The first terminal can then be used to scan one of the commodities and transmit, to the relay server, scanned commodity information. The relay server then registers the scanned commodities for purchase.

20 Claims, 15 Drawing Sheets

(56) References Cited

U.S. PATENT DOCUMENTS

| | | | |
|---|---|---|---|
| 2013/0198039 A1* | 8/2013 | Sridharan | G06Q 30/016 |
| | | | 705/26.44 |
| 2013/0211953 A1* | 8/2013 | Abraham | G06Q 30/06 |
| | | | 705/26.8 |
| 2015/0142591 A1* | 5/2015 | High | G06Q 30/0613 |
| | | | 705/26.41 |
| 2016/0260145 A1* | 9/2016 | High | G06Q 30/0281 |
| 2017/0236177 A1* | 8/2017 | Sebastian | G06Q 30/0208 |
| | | | 705/14.11 |
| 2020/0286161 A1* | 9/2020 | Marguello | G06Q 30/0639 |
| 2021/0182930 A1* | 6/2021 | Yee | G06F 3/0304 |
| 2021/0334889 A1* | 10/2021 | Isgar | H04N 7/185 |
| 2022/0180302 A1* | 6/2022 | Siragusa | G06Q 30/0601 |

OTHER PUBLICATIONS

Cappiello, Irene, Stefano Puglia, and Andrea Vitaletti. "Design and initial evaluation of a ubiquitous touch-based remote grocery shopping process." 2009 First International Workshop on Near Field Communication. IEEE, 2009. (Year: 2009).*

Tomizawa, Tetsuo, and Akihisa Ohya. "Remote shopping robot system,—development of a hand mechanism for grasping fresh foods in a supermarket." 2006 IEEE/RSJ International Conference on Intelligent Robots and Systems. IEEE, 2006. (Year: 2006).*

\* cited by examiner

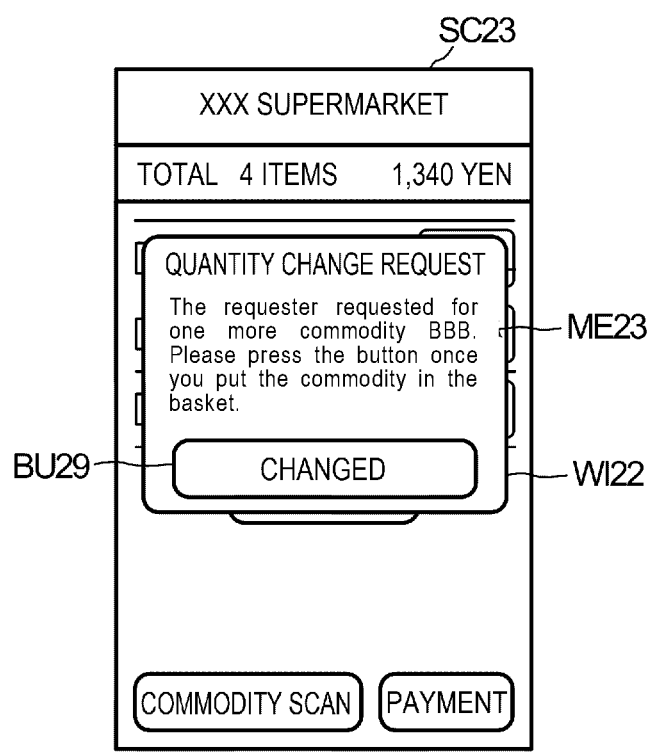

COMMODITY PURCHASE SYSTEM AND RELAY SERVER

CROSS-REFERENCE TO RELATED APPLICATION

This application is based upon and claims the benefit of priority from Japanese Patent Application No. 2020-159715, filed Sep. 24, 2020, the entire contents of which are incorporated herein by reference.

FIELD

Embodiments described herein relate generally to a commodity purchase system, a relay server, and a method performed thereby.

BACKGROUND

It may be difficult for an aged person or the like to go to a store for shopping by himself or herself because of his or her health conditions. It may also be difficult for a person living in a remote place to go to a store for shopping. Such an aged person or a person living in the remote place (hereinafter referred to as "a requester") needs to ask another person such as an acquaintance or a family member to purchase, on behalf of the requester, commodities that the requester desires to purchase.

However, since the requester cannot be in the store during the purchase, he or she is not given a chance to select and purchase additional commodities (e.g., impulse purchases) beyond the originally requested commodities.

In view of such circumstances, there have been demands for a system with which, even if a requester is not physically present in a store, the requester can still select and purchase commodities as if the requester is actually doing the shopping in the store.

BRIEF DESCRIPTION OF THE DRAWINGS

FIG. 20 depicts a quantity change instruction screen displayed by a visitor terminal.

DETAILED DESCRIPTION

Embodiments provide a commodity purchase system, a relay server with which a requester who is not present in a store can select and purchase commodities as if he or she is doing shopping in the store, and a method performed by the relay server.

A commodity purchase system according to an embodiment assists a customer who is not at a store in making a purchase. The system includes a relay server, a first terminal, and a second terminal. The first terminal is configured to capture an image of one or more commodities displayed in the store and output the image. The second terminal is configured to display the image received via the relay server, detect a user selection operation made on the displayed image, and issue a scan request with positional information indicating a position in the image at which the user selection operation has been made. The first terminal is further configured to, upon receipt of the scan request via the relay server, display the image in which the position at which the user selection operation has been made is marked based on the positional information, and scan one of the commodities for registration and transmit, to the relay server, commodity information about said one of the commodities. The relay server is further configured to, based on the received commodity information, register said one of the commodities as a commodity being purchased by the customer.

A commodity purchase system according to one or more embodiments is explained below with reference to the drawings.

The commodity purchase system is a system with which an aged person or a person living in a remote place from a store requests another person, such as an acquaintance and a family member, to visit the store to purchase a commodity on his or her behalf. In the following explanation, the aged person or the person living in the remote place from the store is referred to as a requester and a person who visits the store and purchases a commodity for the requester is referred to as a visitor.

Figure 1:
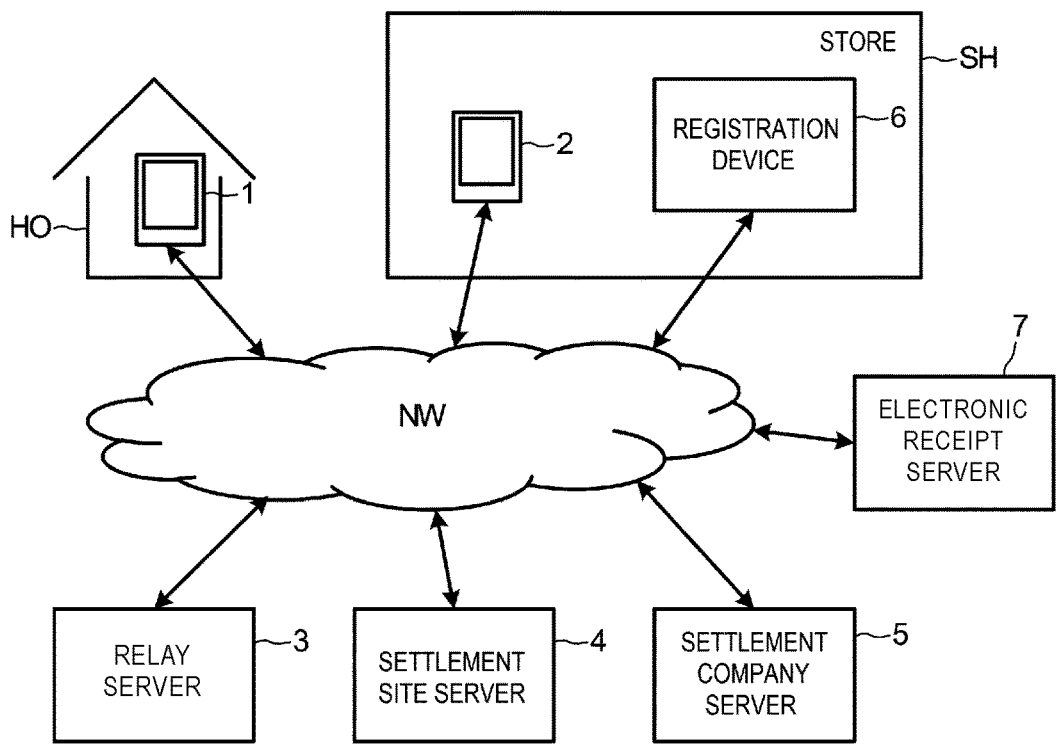
FIG. 1 is a schematic block diagram of a commodity purchase system according to an embodiment.

FIG. 1 is a schematic block diagram of the commodity purchase system according to an embodiment. The commodity purchase system includes a requester terminal 1, a visitor terminal 2, and a relay server 3. The requester terminal 1 and the visitor terminal 2 are capable of transmitting and receiving data via a communication network NW and capable of transmitting and receiving specific data relating to the commodity purchase system via the relay server 3 connected to the communication network NW.

The requester terminal 1 is a mobile terminal such as a smartphone or a personal computer operated by a requester who is at home HO distant from a store SH or a dedicated terminal configured to perform transmission and reception of data relating to the commodity purchase system. In the following explanation, it is assumed that the requester terminal 1 is a smartphone in which a commodity purchase application program for the commodity purchase system has been installed. An "application program" is hereinafter abbreviated as "application".

The visitor terminal 2 is a portable terminal such as a smartphone or a tablet personal computer operated by a visitor visiting the store SH or a dedicated portable terminal such as a tablet terminal configured to perform transmission and reception of data relating to the commodity purchase system lent to the visitor in the store SH. In the following explanation, it is assumed that, like the requester terminal 1, the visitor terminal 2 is a smartphone in which the commodity purchase application for the commodity purchase system has been installed.

The relay server 3 relays data between the requester terminal 1 and the visitor terminal 2 in which the commodity purchase application stores data of a commodity that the requester requests the visitor to purchase. According to a settlement instruction transmitted from the requester terminal 1, the relay server 3 calculates a payment amount of the purchased commodity of the requester and transmits the calculated payment amount to a settlement site server 4 via the communication network NW to perform settlement processing.

The settlement site server 4 is capable of transmitting and receiving data to and from a settlement company server 5 via the communication network NW. The settlement company server 5 is a server operated by a settlement company such as a credit card company. The settlement site server 4 performs settlement in communication with the settlement company server 5 according to a settlement method designated by the requester. The settlement method includes an electronic commerce (FC) method such as credit card settlement, electronic money settlement, point settlement, or code settlement (also called mobile settlement, smartphone settlement, or the like). The code settlement can be used by, for example, linking a code and a credit card or electronic money in advance in the commodity purchase application installed in the requester terminal 1. A settlement agency server may be interposed between the settlement site server 4 and the settlement company server 5. Alternatively, the settlement site server 4 and the settlement company server 5 are integrated into a single server.

The commodity purchase system can further include a registration device 6 installed in the store SH. The registration device 6 is a device with which the visitor performs registration processing and settlement processing for a purchased commodity by himself or herself.

After the settlement by the settlement site server 4 ends, the relay server 3 outputs settlement information including amount information to the visitor terminal 2 and the registration device 6. The amount information is a settlement completion list including a list of commodities purchased by the requester and the payment amounts.

The registration device 6 dispenses a receipt concerning the commodity purchased by the requester and dispenses a receipt concerning the commodity purchased by the visitor, if any. The dispensing of the receipt may be printing on receipt paper by a printer or may be transmission of electronic receipt information to an electronic receipt server 7 via the communication network NW.

In FIG. 1, only one home HO, one requester terminal 1, one store SH, one visitor terminal 2, one settlement company server 5, one registration device 6, and one electronic receipt server 7 are illustrated. However, two or more requester terminals 1 operated by requesters being at their homes HO, two or more visitor terminals 2 visiting stores SH for the requesters, two or more settlement company servers 5, two or more registration devices 6, and/or two or more electronic receipt servers 7 may be present.

Figure 2:
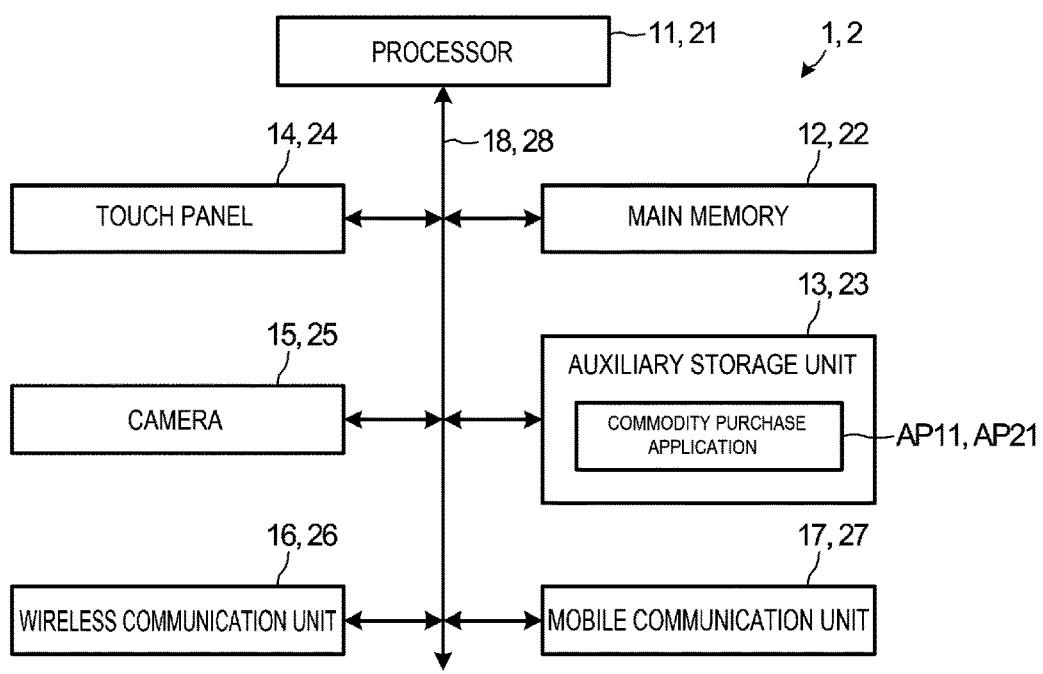
FIG. 2 is a hardware block diagram of a requester terminal or a visitor terminal according to an embodiment.

FIG. 2 is a hardware block diagram of the requester terminal 1 and the visitor terminal 2.

The requester terminal 1 includes a processor 11, a main memory 12, an auxiliary storage unit 13, a touch panel 14, a camera 15, a wireless communication unit 16, a mobile communication unit 17, and a system transmission line 18. The processor 11, the main memory 12, the auxiliary storage unit 13, the touch panel 14, the camera 15, and the mobile communication unit 17 are connected via the system transmission line 18. The processor 11, the main memory 12, and the auxiliary storage unit 13 connected by the system transmission line 18 make up a controller for controlling the requester terminal 1.

Similarly, the visitor terminal 2 includes a processor 21, a main memory 22, an auxiliary storage unit 23, a touch panel 24, a camera 25, a wireless communication unit 26, a mobile communication unit 27, and a system transmission line 28.

Each of the processors 11 and 21 executes an operating system and one or more information processing programs or applications to perform various functions of the requester terminal 1 or the visitor terminal 2. Each of the processors 11 and 21 is, for example, a CPU (central processing unit).

Each of the main memories 12 or 22 includes a nonvolatile memory region and a volatile memory region. Each of the main memories 12 and 22 stores the information processing programs in the nonvolatile memory region. Each of the main memories 12 and 22 may store, in the nonvolatile or volatile memory region, data necessary for the processor 11 or 21 to execute information processing. The volatile memory region of each of the main memories 12 and 22 is a work area in which data is temporarily stored by the processor 11 or 21. The nonvolatile memory region is, for example, a ROM (read only memory). The volatile memory region is, for example, a RAM (random access memory).

Each of the auxiliary storage units 13 and 23 is a storage device such as an EEPROM (electric erasable programmable read-only memory), an HDD (hard disc drive), and an SSD (solid state drive). Each of the auxiliary storage units 13 and 23 stores data used by the processor 11 or 21 in performing various kinds of processing or data generated by the processor 11 or 21. Each of the auxiliary storage units 13 and 23 may store the information processing programs.

Each of the touch panels 14 and 24 functions as an input device and a display device of the requester terminal 1 or the visitor terminal 2.

Each of the cameras 15 and 25 includes an optical system and an image sensor and generates, with the image sensor, image data representing a visual field formed by the optical system.

Each of the wireless communication units 16 and 26 exchanges data with an access point installed in the home HO or the store SH by wireless communication conforming to a wireless communication protocol. As the wireless communication unit 16 or 26, for example, a well-known communication device conforming to the IEEE 802.11 standard can be used. The access point of the store SH is connected to a store LAN (local area network). The store LAN is connected to the communication network NW via a gateway.

Each of the mobile communication units 17 and 27 is a network interface circuit for data communication via the communication network NW. As the mobile communication unit 17 or 27, for example, a well-known communication device for performing data communication via a mobile communication network can be used.

Each of the system transmission lines 18 and 28 includes an address bus, a data bus, and a control signal line through which data and control signals are exchanged among the connected components.

The auxiliary storage units 13 and 23 store commodity purchase applications AP11 and AP21, respectively. The commodity purchase application AP11 and the commodity purchase application AP21 are the same program for respectively causing the requester terminal 1 and the visitor terminal 2 to function as a user interface of the commodity purchase system. The commodity purchase applications AP11 and AP21 are used in common in a plurality of requester terminals 1 or a plurality of visitor terminals 2.

Figure 3:
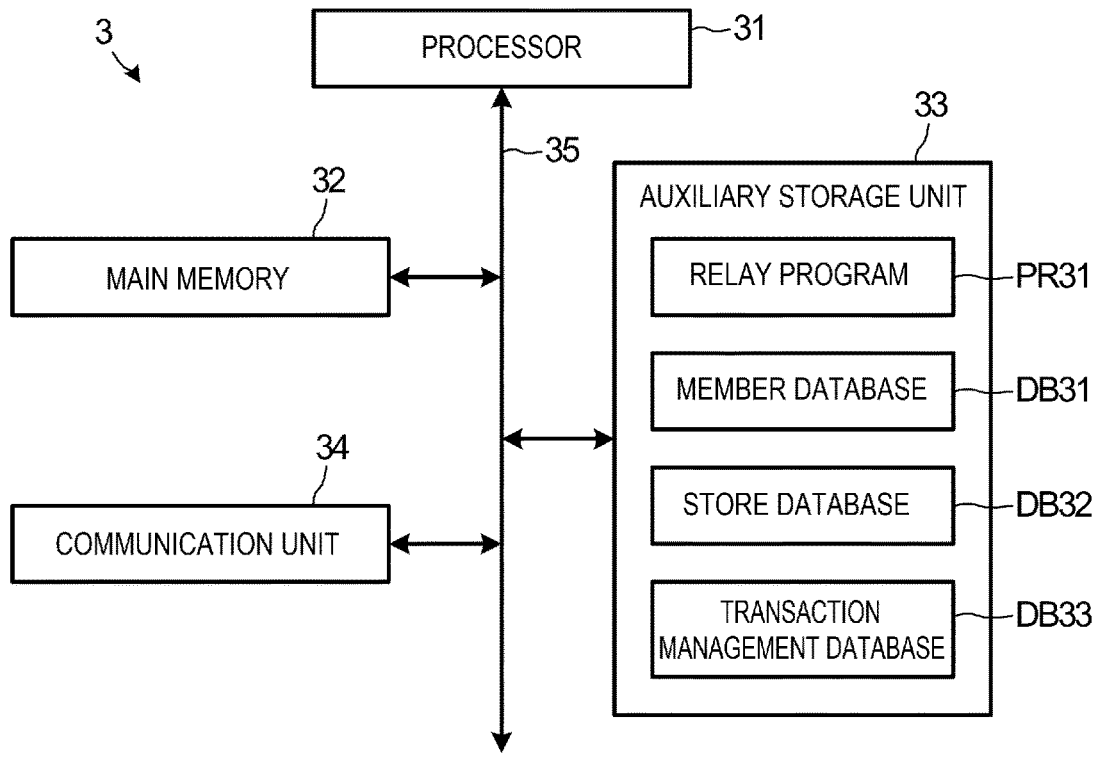
FIG. 3 is a hardware block diagram of a relay server.

FIG. 3 is a hardware block diagram of the relay server 3. The relay server 3 includes a processor 31, a main memory 32, an auxiliary storage unit 33, a communication unit 34, and a system transmission line 35. The processor 31, the main memory 32, the auxiliary storage unit 33, and the communication unit 34 are communicably connected via the system transmission line 35. The processor 31, the main memory 32, and the auxiliary storage unit 33 connected by the system transmission line 35 make up a controller for controlling the relay server 3. The functions of the processor 31, the main memory 32, the auxiliary storage unit 33, and the system transmission line 35 are similar to the functions of the processor 11, the main memory 12, the auxiliary storage unit 13, and the system transmission line 18.

The communication unit 34 is a network interface circuit configured to perform data communication via the communication network NW. The communication unit 34 is, for example, a network interface card (NIC).

The auxiliary storage unit 33 stores a relay program PR31, which is one of the information processing programs used in the commodity purchase system. The relay program PR31 is executed by the processor 31 to perform the functions of the relay server 3.

The auxiliary storage unit 33 stores a member database DB31, a store database DB32, and a transaction management database DB33.

Figure 4:
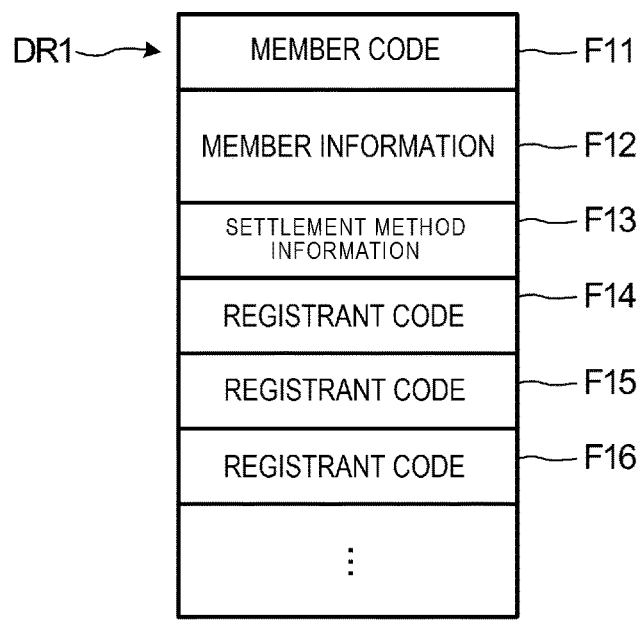
FIG. 4 depicts a data structure of a data record included in a member database.

FIG. 4 depicts a data structure of a data record DR1 included in the member database DB31. The member database DB31 is a database for managing information about a requester who has been registered to the commodity purchase system as a member. Accordingly, the member database DB31 includes data records DR1 as many as registered users. The data record DR1 includes fields F11, F12, F13, and F14. The data record DR1 can further include additional fields including F15 and F16.

In the field F11, a member code for distinguishing the correlated requester from other requesters is set. The member code is, for example, a unique identification code set for each user in order to identify individual users of the commodity purchase system. Alternatively, as the member code, for example, an identification code set for the commodity purchase application AP11 or AP21 can be used if such an application AP11 or AP21 is installed in the requester terminal 1 or the visitor terminal 2.

In the field F12, member information, which is attribute information about the requester specified by the member code, is set. The member information includes a name, sex, age, an address, a telephone number, and an electronic mail address. The member information is used if a commodity purchased by the requester is delivered from the store SH.

In the field F13, settlement method information about a settlement method designated by the requester is set. The settlement method information is a credit card number, a code settlement ID (identifier), or the like. If a plurality of settlement methods is selectable, the settlement method information includes a settlement method code for identifying a settlement method.

In the field F14, a registrant code for identifying a registrant registered as a visitor by the requester is set. As the registrant code, like the member code, a unique identification code set for each user of the commodity purchase system. An identification code set for the commodity purchase application AP11 or AP21 can also be used. That is, one identification code is used as a member code if the member uses the commodity purchase system as a requester, and is used as a registrant code if the member uses the commodity purchase system as a visitor. The registrant code is saved as a history unless deletion operation is performed by the user. Accordingly, every time a requester requests a new visitor to purchase a commodity, a new registrant code is added in the field F15, F16, . . . in the data record DR1.

Figure 5:
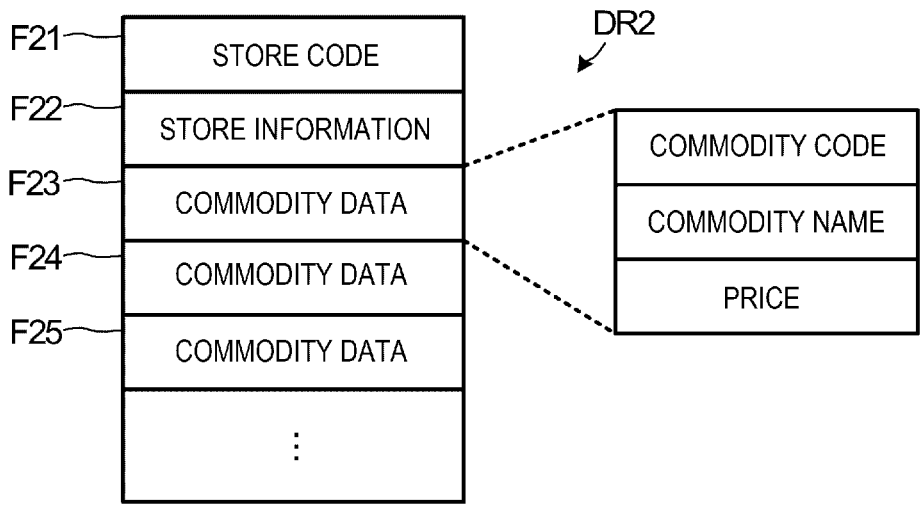
FIG. 5 depicts a data structure of a data record included in a store database.

FIG. 5 is a schematic diagram illustrating a data structure of a data record DR2 included in the store database DB32. The store database DB32 is a database for managing information about the store SH using the commodity purchase system and is a set of data records correlated with the registered store SH. Accordingly, the store database DB32 includes data records DR2 as many as registered stores SH. The data record DR2 includes fields F21, F22, F23, F24, F25, . . . .

In the field F21, a store code for distinguishing the correlated store SH from other stores SH is set. The store code is, for example, a unique identification code set for each store SH in order to identify individual stores SH of the commodity purchase system.

In the field F22, store information, which is attribute information about the store SH specified by the store code, is set. The store information includes a store name, an address, and a telephone number.

In the fields F23, F24, F25, . . . , commodity data correlated with commodities sold by the correlated store SH are set. The commodity data indicate commodity information about the correlated commodities such as commodity codes, commodity names, and prices. The commodity code is an identification code to identify a commodity for each SKU (stock keeping unit). For example, a JAN (Japanese article number) code is used. The commodity name is a name of the commodity. The price is a sales price of the commodity.

Figure 6:
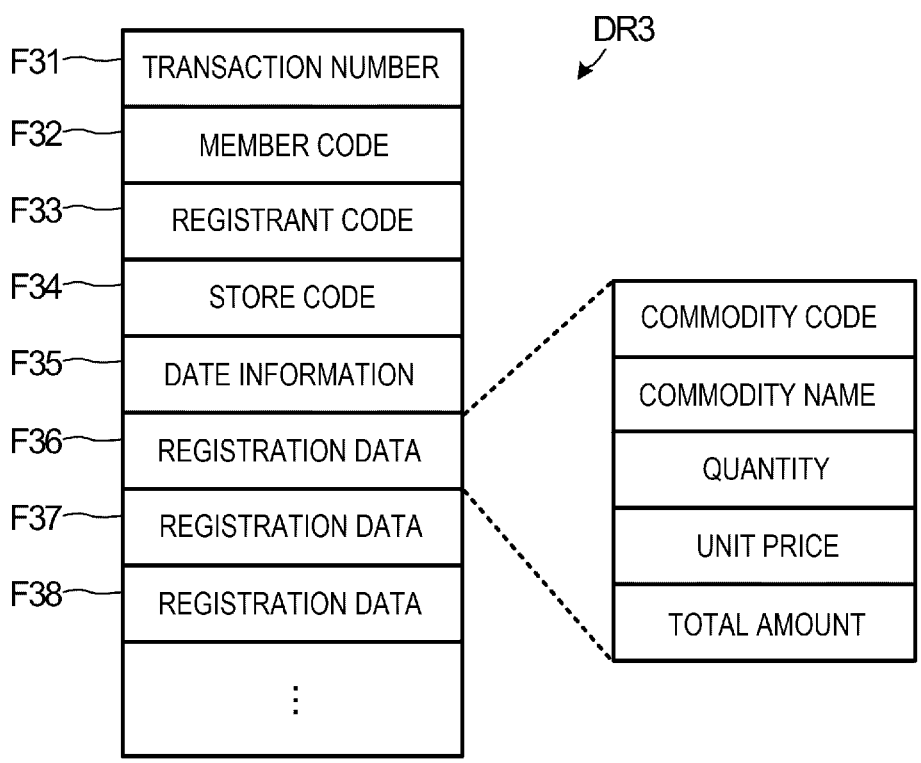
FIG. 6 depicts a data structure of a data record included in a transaction management database.

FIG. 6 depicts a data structure of a data record DR3 included in the transaction management database DB33. The transaction management database DB33 is a database for managing transactions in the commodity purchase system and is a set of data records correlated with the transactions. Accordingly, the transaction management database DB33 includes data records DR3 as many as the transactions. The data record DR3 includes fields F31, F32, F33, F34, F35, F36, F37, F38, . . . .

In the field F31, a transaction number for distinguishing the correlated transaction from other transactions is set. The transaction number is, for example, a unique identification code set for each transaction in order to identify individual transactions in the commodity purchase system.

In the fields F32, F33, and F34, a member code, a registrant code, and a store code for specifying a requester, a visitor, and the store SH relating to the transaction are set.

In the field F35, a date and time of completion of a transaction end is set as date information.

In the fields F36, F37, F38, . . . , registration data correlated with a purchased commodity of the requester are set. The registration data includes data concerning the correlated purchased commodity such as a commodity code, a commodity name, a quantity, a unit price, and a total amount.

Figure 7:
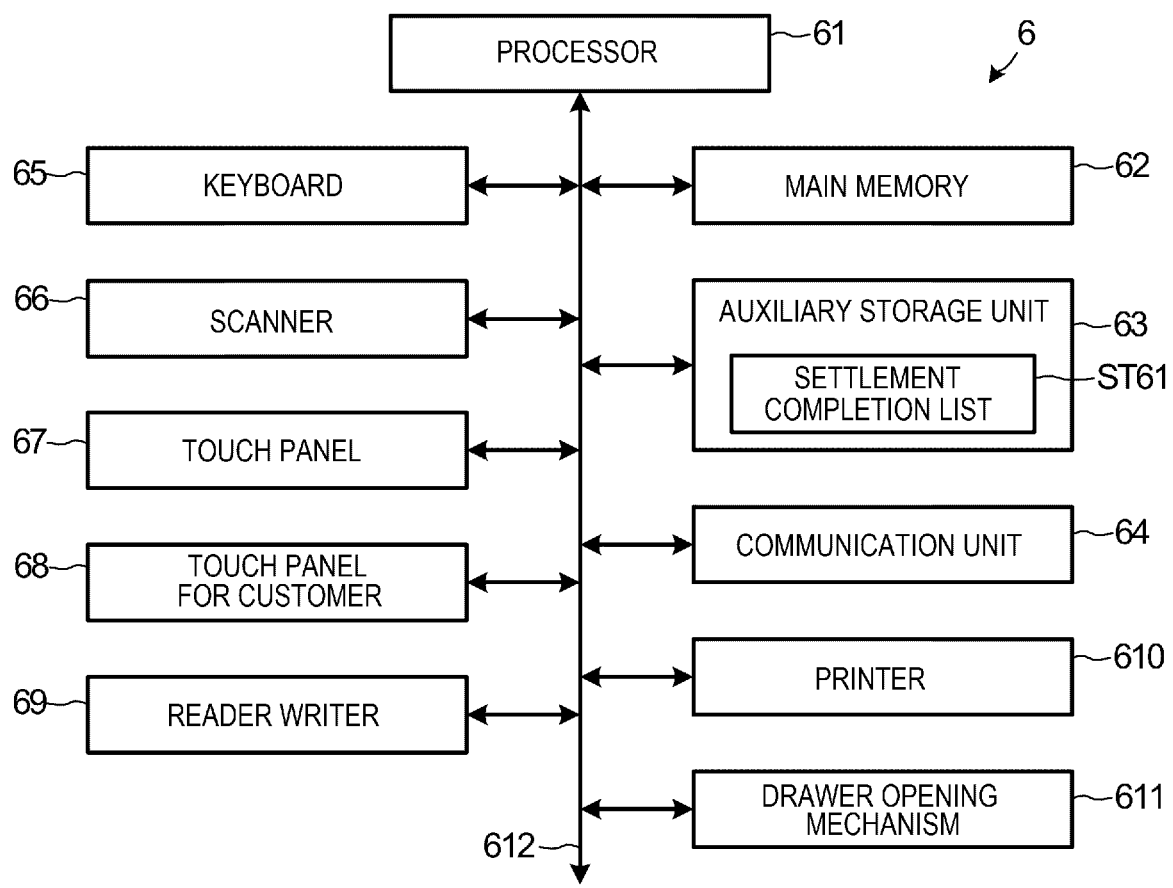
FIG. 7 is a hardware block diagram of a registration device according to an embodiment.

FIG. 7 is a hardware block diagram of the registration device 6. The registration device 6 is a POS (Point Of Sales) terminal and includes a processor 61, a main memory 62, an auxiliary storage unit 63, a communication unit 64, a keyboard 65, a scanner 66, a touch panel 67, a touch panel for customer 68, a reader writer 69, a printer 610, a drawer opening mechanism 611, and a system transmission line 612. The processor 61, the main memory 62, the auxiliary storage unit 63, the communication unit 64, the keyboard 65, the scanner 66, the touch panel 67, the touch panel for customer 68, the reader writer 69, the printer 610, and the drawer opening mechanism 611 are connected to one another via the system transmission line 612. The processor 61, the main memory 62, and the auxiliary storage unit 63 connected by the system transmission line 612 make up a controller of the registration device 6. Functions of the processor 61, the main memory 62, the auxiliary storage unit 63, and the system transmission line 612 are similar to the functions of the processor 11, the main memory 12, the auxiliary storage unit 13, and the system transmission line 18.

The communication unit 64 is a network interface circuit for data communication via the store LAN. The communication unit 64 receives settlement information from the relay server 3 via the store LAN and the communication network NW. The auxiliary storage unit 63 includes a settlement-completion-list storing section ST61. In the settlement-completion-list storing section ST61, a settlement completion list included in the settlement information received from the relay server 3 is stored. The communication unit 64 can also perform data communication with other registration devices 6 and store servers in the store SH connected via the store LAN.

The keyboard 65 has a plurality of keys including numeric keys, a subtotal key, a cancel key, and a clear key. The functions of the subtotal key, the cancel key, the clear key, and the like may be allocated to other general-purpose keys such as numeric keys.

The scanner 66 reads a code symbol such as a barcode or a two-dimensional data code. The scanner 66 may be a type for reading the code symbol by scanning a laser beam or may be a type for reading the code symbol by capturing an image with an imaging device.

The touch panel 67 is a device functioning as both of an input device and a display device. The touch panel 67 displays information to a store clerk, who is an operator of the registration device 6, and receives an operation input by the store clerk.

The keyboard 65, the scanner 66, and the touch panel 67 make up an input and output device for the store clerk to perform registration operation for a purchased commodity.

Like the touch panel 67, the touch panel for customer 68 is a device functioning as both of an input device and a display device. The touch panel for customer 68 displays information to a visitor, who is a shopper for whom registration of a commodity to be purchased is performed in the registration device 6, and receives an operation input by the visitor.

The reader writer 69 has a function of reading data recorded in a medium such as a card or a smartphone and a function of writing data in the medium. For example, the card is a membership card or a point card besides a payment card for settlement such as a credit card, a debit card, an electronic money card, and a prepaid card. The reader writer 69 may be a device of any one of a magnetic type, a contact type, and a noncontact type or may include a plurality of types of devices.

The printer 610 dispenses a receipt by printing various character strings, images, or the like on receipt paper. As the printer 610 of this type, for example, a thermal printer or a dot impact printer can be used.

The drawer opening mechanism 611 opens a drawer for storing cash or notes such as gift certificates and coupons.

The operation of the commodity purchase system is explained. Various kinds of processing explained below are mere examples. Modification to a part of the processing, omission of a part of the processing, addition of other processing, and the like are possible as appropriate. For example, in the following explanation, some parts of the processing are omitted in order to clearly explain characteristic operation in a particular embodiment. For example, if an error occurs, processing for coping with the error may be performed. However, description about such processing is omitted.

A service provided to a user through the operation of the commodity purchase system explained below is referred to as a commodity purchase service.

In order to use the commodity purchase service, the user installs the commodity purchase application AP11 or AP21 in, for example, his or her smartphone to use the smartphone as the requester terminal 1 or the visitor terminal 2. The user as the requester designates, using a smartphone function such as a telephone, a mail, or a chat or orally, the store SH, which is affiliated with the commodity purchase service, and requests another user to purchase a commodity in the store SH as a visitor. The requester and the visitor communicate with each other by the telephone, the mail, or the chat and start the commodity purchase applications AP11 and AP21 each other at any timing such as the visitor's entry to the designated store SH. The commodity purchase applications AP11 and AP22 may have the functions of telephone, mail, chat, or the like so that the requester and the visitor may communicate with each other during the purchase.

Figure 8:
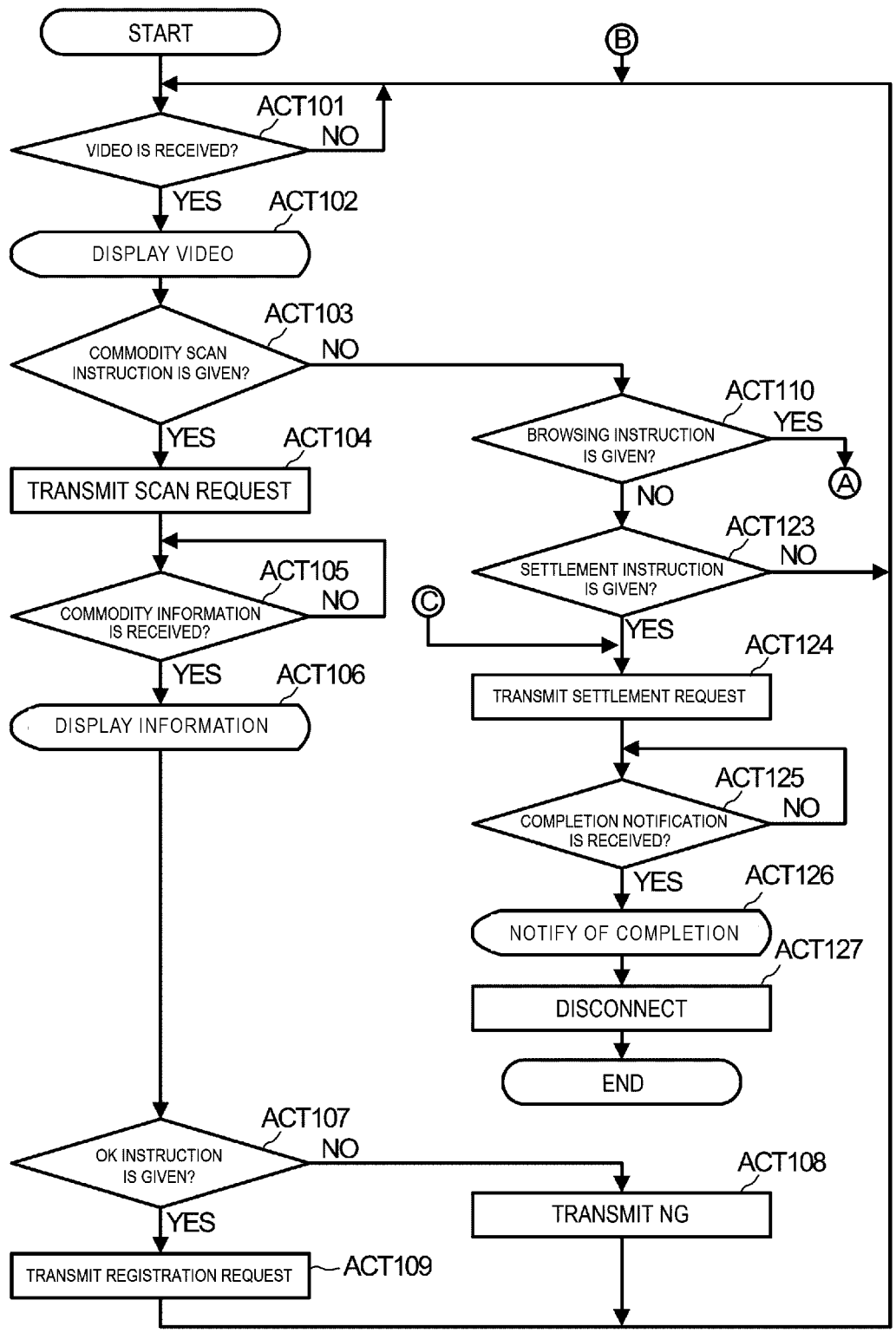
FIG. 8 is a flowchart of information processing performed by a requester terminal.
Figure 9:
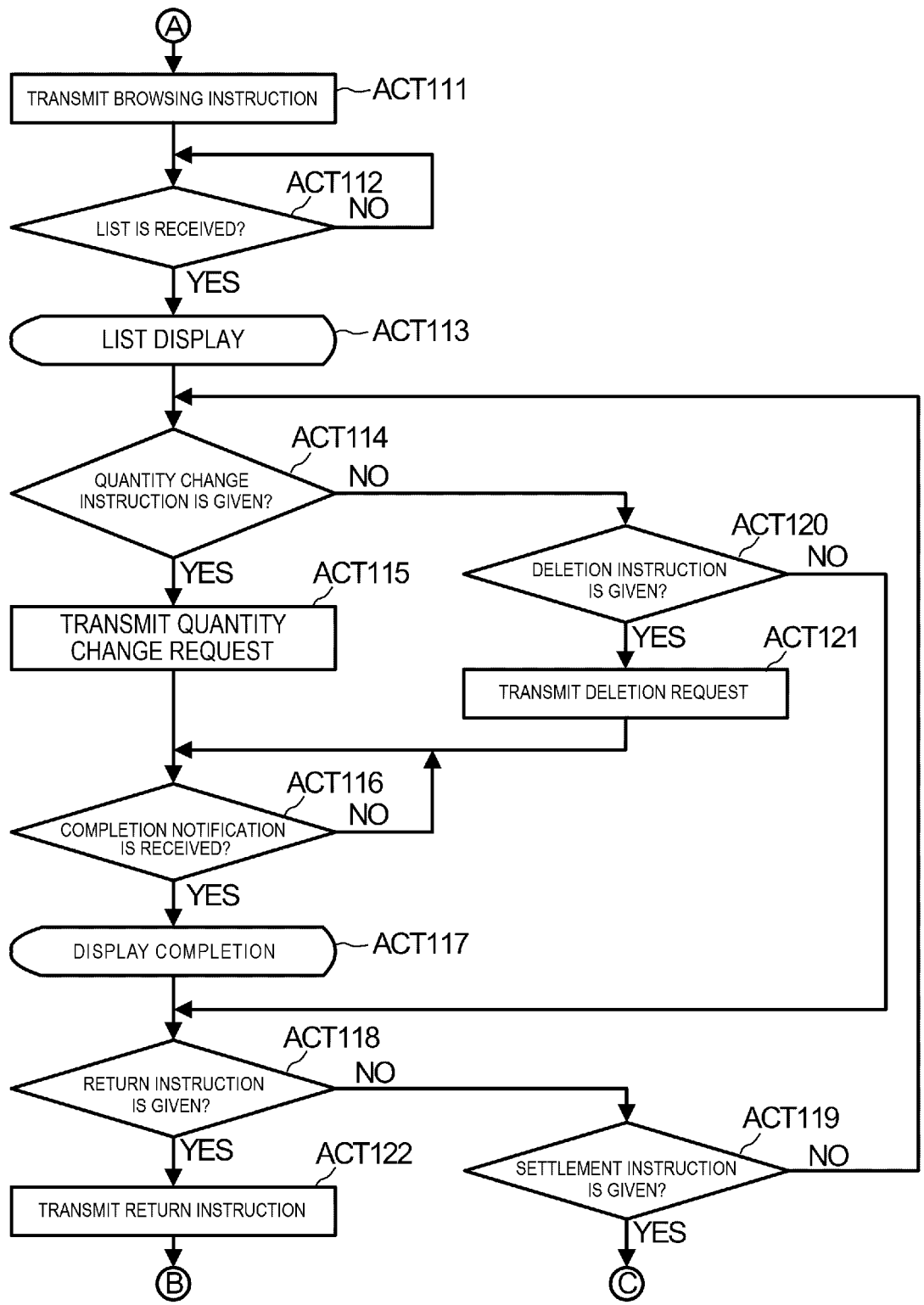
FIG. 9 is a flowchart of information processing performed by a requester terminal.
Figure 10:
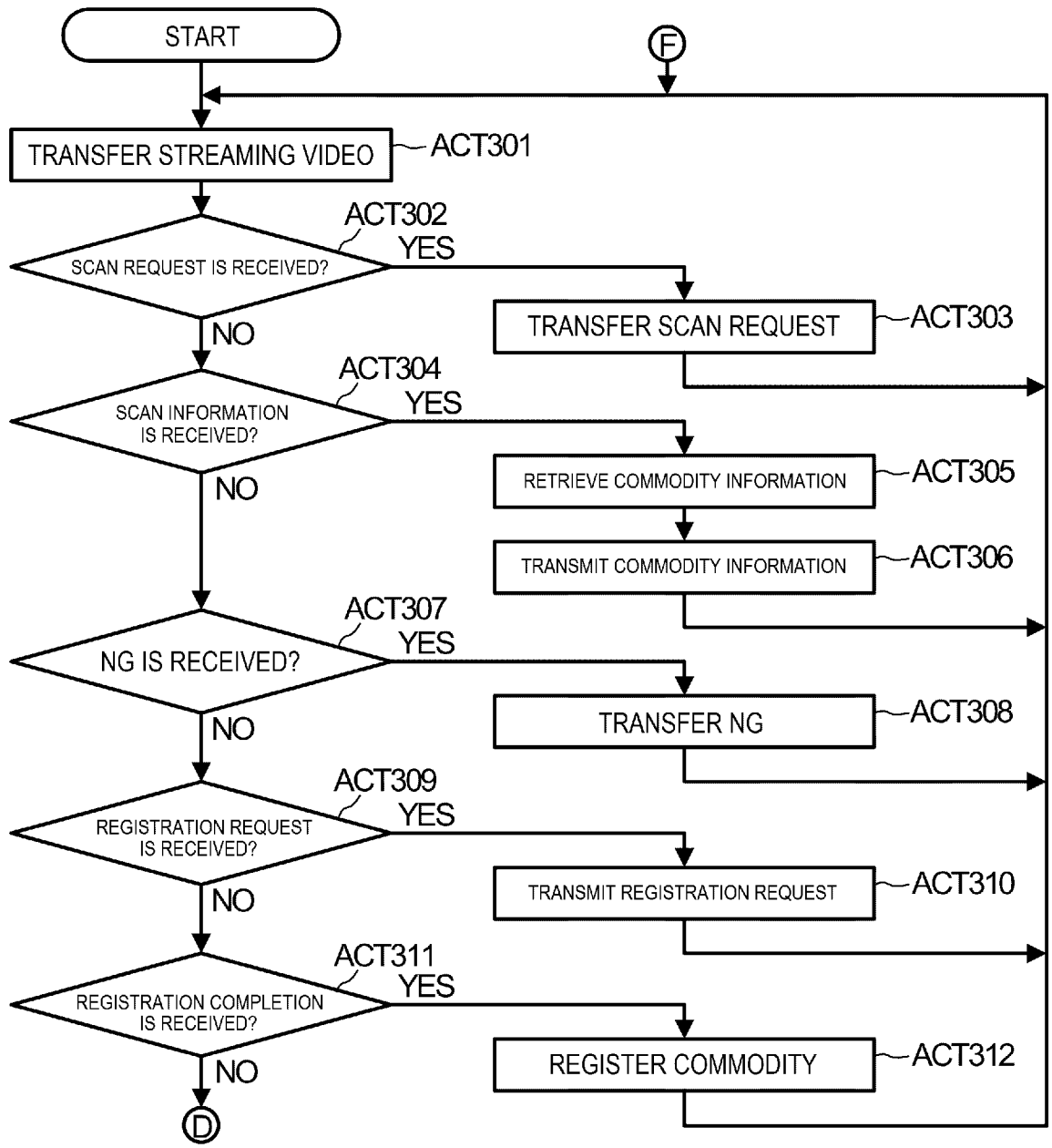
FIG. 10 is a flowchart of information processing performed by a relay server.
Figure 11:
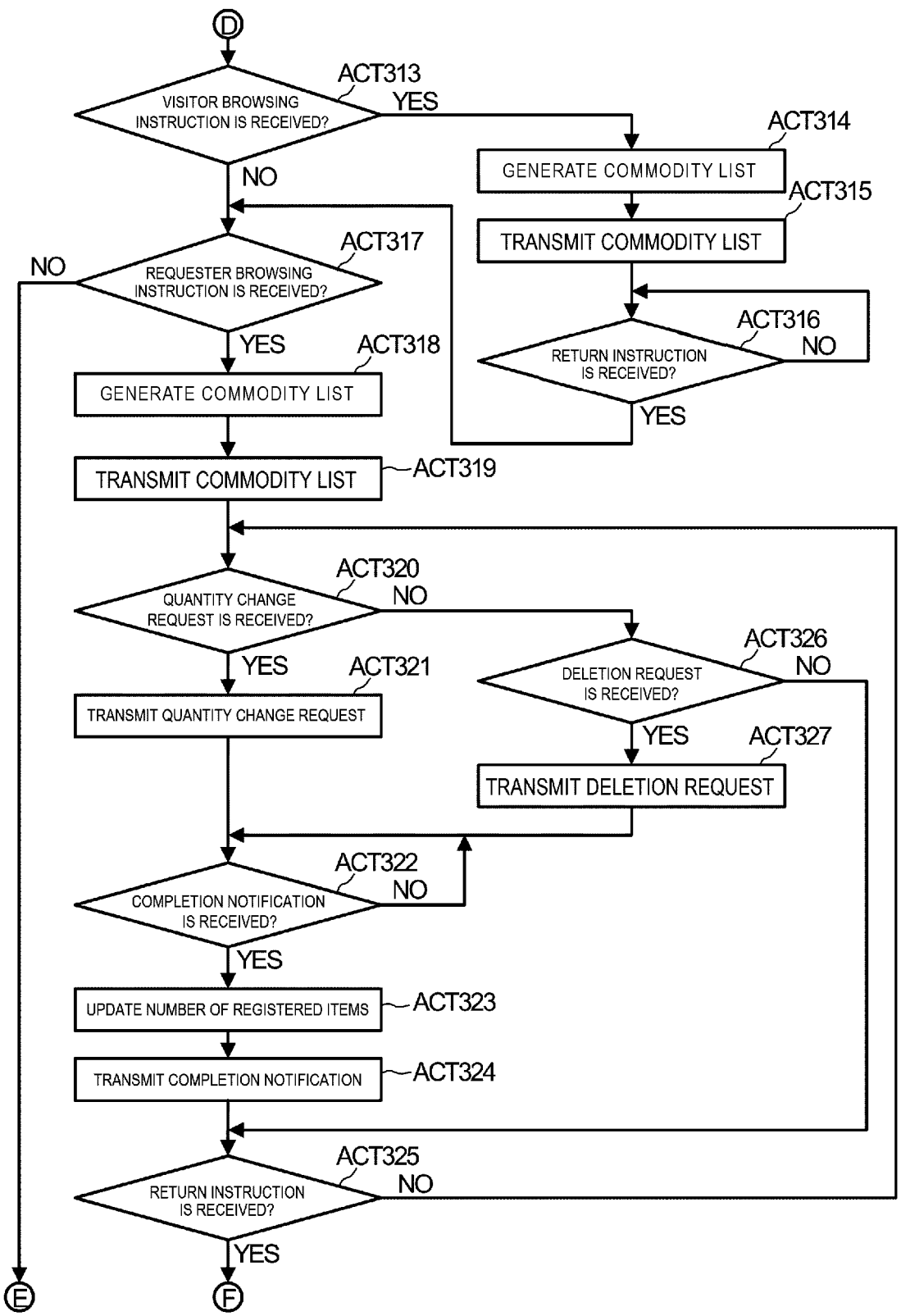
FIG. 11 is a flowchart of information processing performed by a relay server.
Figure 12:
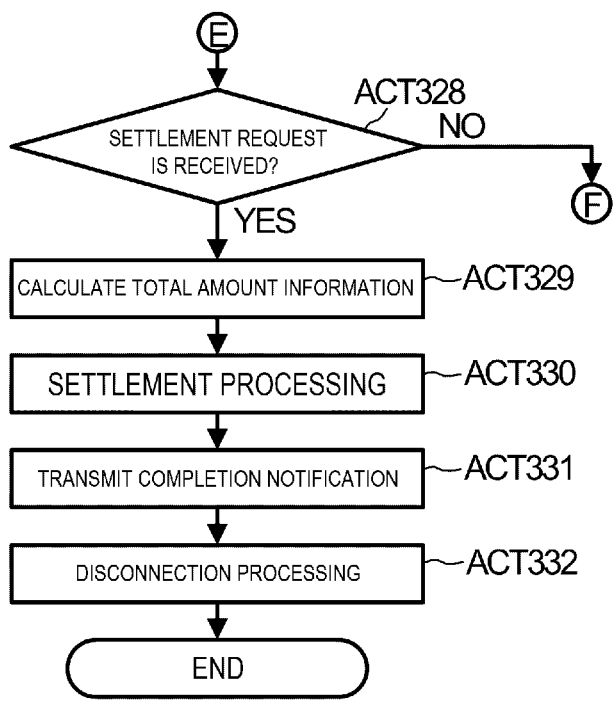
FIG. 12 is a flowchart of information processing performed by a relay server.
Figure 13:
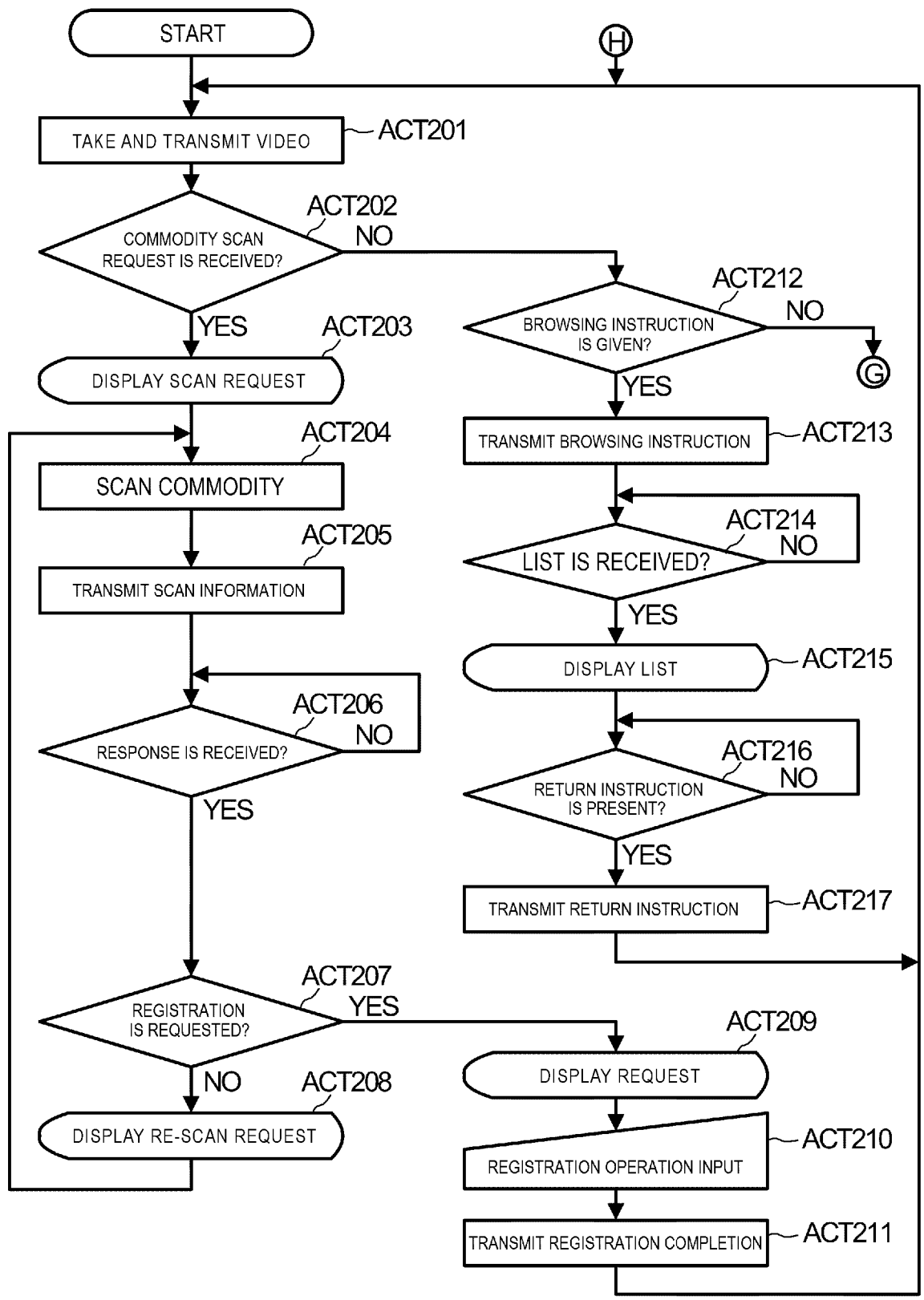
FIG. 13 is a flowchart of information processing performed by a visitor terminal.
Figure 14:
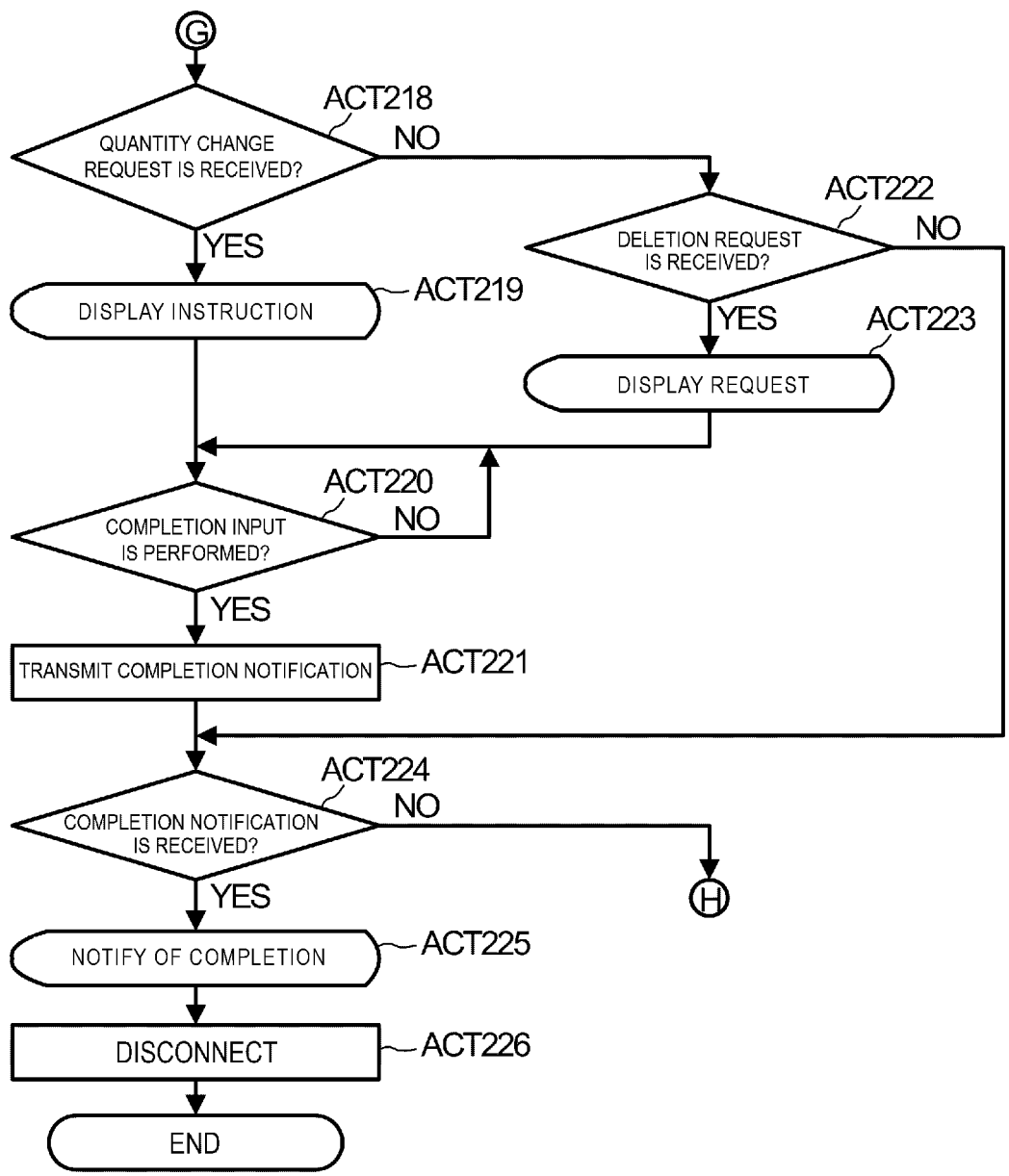
FIG. 14 is a flowchart of information processing performed by a visitor terminal.
Figure 15:
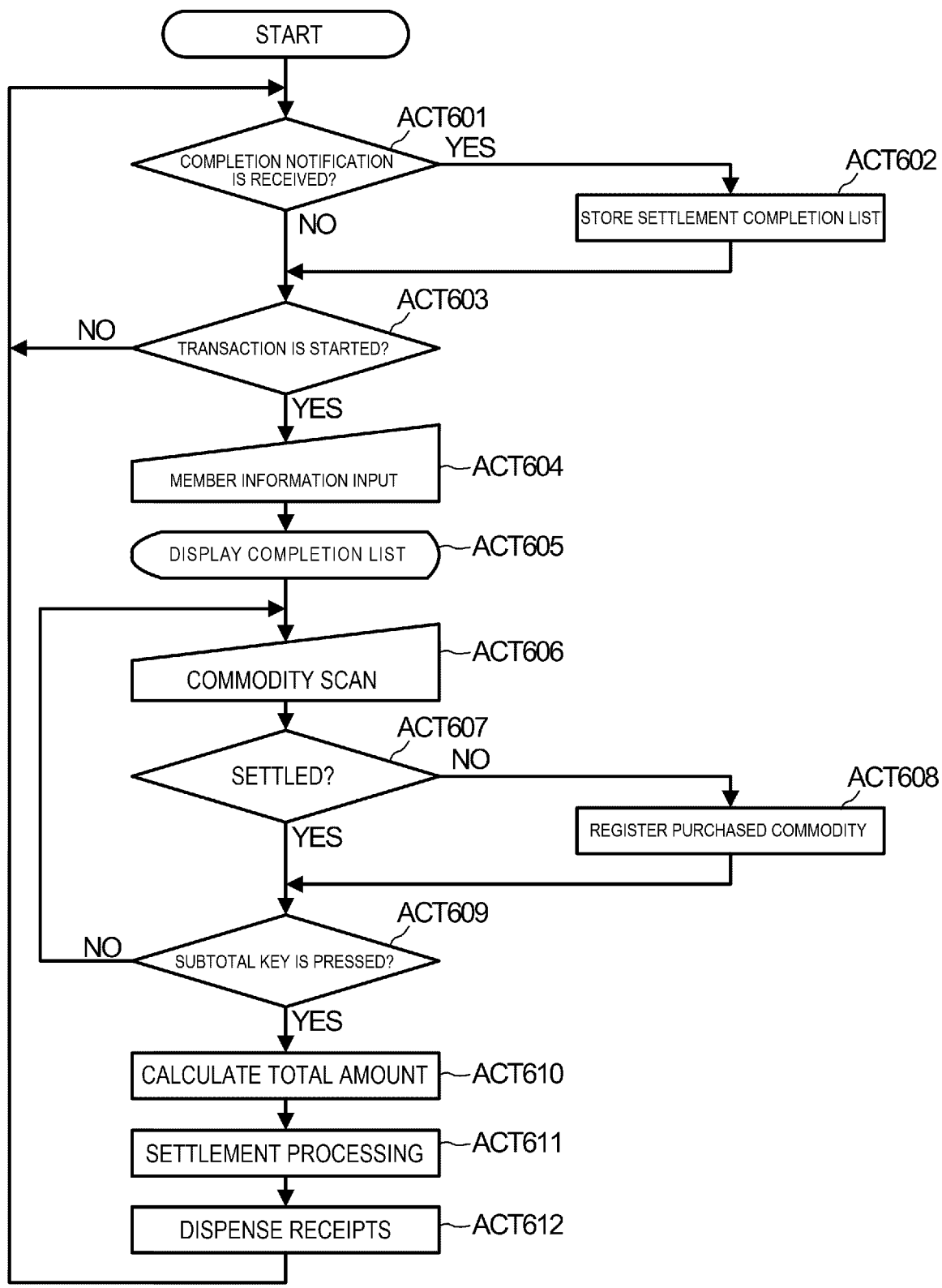
FIG. 15 is a flowchart of information processing performed by a registration device.

FIGS. 8 and 9 are flowcharts of information processing based on the commodity purchase application AP11 executed by the processor 11 of the requester terminal 1. FIGS. 10, 11, and 12 are flowcharts of information processing based on the relay program PR31 executed by the processor 31 of the relay server 3. FIGS. 13 and 14 are flowcharts of information processing of the commodity purchase application AP21 executed by the processor 21 of the visitor terminal 2. FIG. 15 is a flowchart of information processing executed by the processor 61 of the registration device 6.

It is assumed that the commodity purchase applications AP11 and AP21 are started by the processors 11 and 21 of the requester terminal 1 and the visitor terminal 2 and connected to the relay server 3, and necessary processing such as authentication have already been carried out. Although not particularly illustrated, according to this processing, the processor 31 of the relay server 3 generates, in the transaction management database DB33, the data record DR3 having a new transaction number and sets, in the data record DR1 corresponding to the requester and the visitor in the member database DB31, information for data transmission such as an identification code and an IP address of each of the commodity purchase applications AP11 and AP21.

In ACT 101 in FIG. 8, the processor 11 of the requester terminal 1 waits for a streaming video transmitted from the visitor terminal 2 through the relay server 3 to be received by the wireless communication unit 16.

The visitor moves towards a commodity shelf on which a commodity, which is notified beforehand from the requester, is displayed in the store SH and uses the camera 25 of the visitor terminal 2 to take one or more images or videos of the commodity shelf. During the movement, the visitor may put a commodity to be purchased by the visitor in a shopping basket, that is, simultaneously carry out shopping for the visitor himself or herself. In ACT 201 in FIG. 13, the processor 21 of the visitor terminal 2 controls the wireless communication unit 26 to transmit a video taken by the camera 25 to the relay server 3 as a streaming video.

In ACT 301 in FIG. 10, upon receipt of the streaming video from the visitor terminal 2 via the communication unit 34, the processor 31 of the relay server 3 controls the communication unit 34 to transfer the streaming video to the requester terminal 1.

In ACT 101, upon receipt of the streaming video from the visitor terminal 2 through the wireless communication unit 16, the processor 11 of the requester terminal 1 controls the touch panel 14 to display the streaming video in ACT 102.

Figure 16:
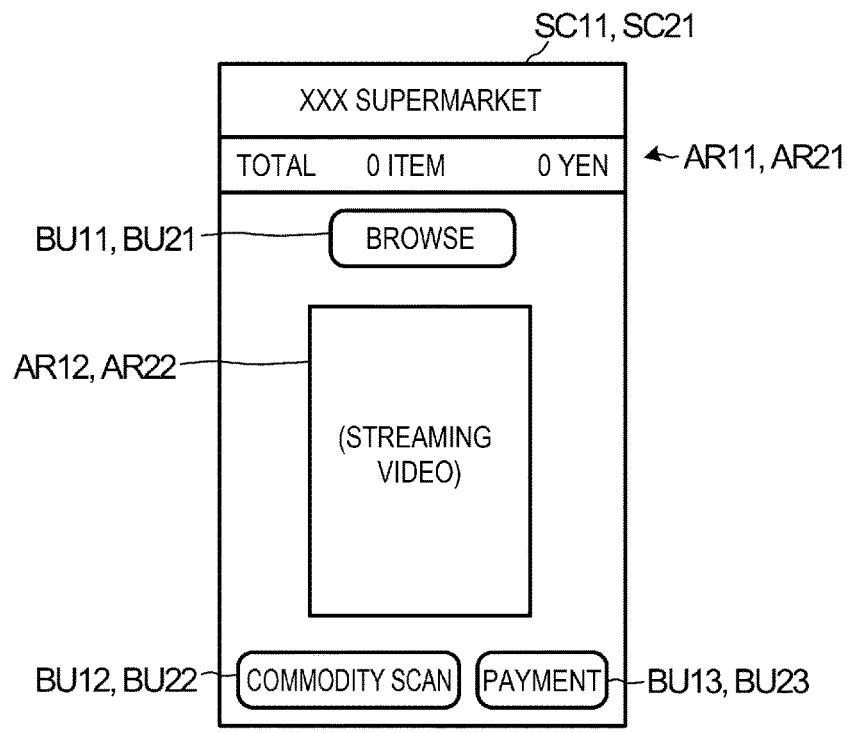
FIG. 16 depicts a streaming screen displayed by a requester terminal and a visitor terminal.

FIG. 16 depicts an example of a streaming screen SC11 displayed on the touch panel 14 of the requester terminal 1. The streaming screen SC11 includes display areas AR11 and AR12 and buttons BU11, BU12, and BU13. The display area AR11 displays a total number of items of commodities to be purchased and a total amount of prices of the commodities. The display area AR12 displays a streaming video. The button BU11 is a soft key for displaying a list of the commodities. The button BU12 is a soft key for the requester to request the visitor to scan a commodity. The button BU13 is a soft key for the requester to settle the commodities.

Thereafter, in ACT 103, the processor 11 of the requester terminal 1 determines whether an instruction for commodity scan is given. If a commodity desired to be purchased is shown in the streaming video displayed in the display area AR12, the requester touches the commodity shown in the video. Accordingly, the processor 11 determines presence or absence of the instruction for commodity scan according to presence or absence of the touch operation on the display area AR12 by the requester.

If the instruction for commodity scan is given, in ACT 104, the processor 11 of the requester terminal 1 controls the wireless communication unit 16 to transmit a commodity scan request to the relay server 3. The commodity scan request includes coordinate information indicating coordinates of the touched display area AR12. The commodity scan request may further include a frame number of the streaming video when the requester touches the display area AR12. Thereafter, in ACT 105, the processor 11 of the requester terminal 1 waits for commodity information transmitted from the relay server 3 to be received by the wireless communication unit 16.

After transferring the streaming video received from the visitor terminal 2 to the requester terminal 1 in ACT 301, in ACT 302, the processor 31 of the relay server 3 determines whether the commodity scan request transmitted from the requester terminal 1 is received by the communication unit 34. If determining that the scan request transmitted from the requester terminal 1 is received, in ACT 303, the processor 31 controls the communication unit 34 to transfer the scan request to the visitor terminal 2. Thereafter, the processor 31 proceeds to ACT 301.

After transmitting the streaming video to the relay server 3 in ACT 201, in ACT 202, the processor 21 of the visitor terminal 2 determines whether the commodity scan request transmitted from the requester terminal 1 through the relay server 3 is received by the wireless communication unit 26. If determining that the commodity scan request is received, in ACT 203, the processor 21 controls the touch panel 24 to display information indicating that the commodity scan request is received. At this time, in order to surely notify the visitor that the commodity scan request is received, the processor 21 may control a speaker to output an alarm sound or a vibration mechanism such as a motor to vibrate.

In the visitor terminal 2, while the streaming video is transmitted, the screen same as the streaming screen SC11 in the requester terminal 1 is displayed on the touch panel 24. That is, as illustrated in FIG. 16, a streaming screen SC21 includes display areas AR21 and AR22 and buttons BU21, BU22, and BU23. The display areas AR21 and AR22 and the buttons BU21 and BU22 are the same as the display areas AR11 and AR12 and the buttons BU11 and BU12 of the streaming screen SC11 in the requester terminal 1. The button BU23 does not have a function of a soft key unlike the button BU13 of the streaming screen SC21 and is only displayed as a button image. In such a streaming screen SC21, the processor 21 performs, for example, display of the commodity scan request explained below. That is, the processor 21 controls the touch panel 24 to output a visual notification such as flashing of the button BU22. Further, the processor 21 switches the video displayed in the display area AR22 from the streaming video to a still image. At this time, if a frame number is included in the received commodity scan request, the processor 21 can display the frame image specified by the frame number. If any frame number is not included in the commodity scan request, the processor 21 selects a frame image based on the time when the commodity scan request is transmitted. The processor 21 controls the touch panel 24 to display, based on the coordinates included in the commodity scan request, on the still image, a touch position mark indicating a position of the image touched by the requester. The visual notification may be made by flashing or changing colors of a frame line of the display area AR22.

The visitor checks the still image and the touch position mark in the display of the commodity scan request and specifies a commodity presumed to be designated by the requester. The visitor touches the button BU22 on the streaming screen SC21 to declare that the visitor will perform scan of the commodity. Consequently, in ACT 204, the processor 21 switches the streaming screen SC21 to a registration screen and performs the scan of the commodity.

Figure 17:
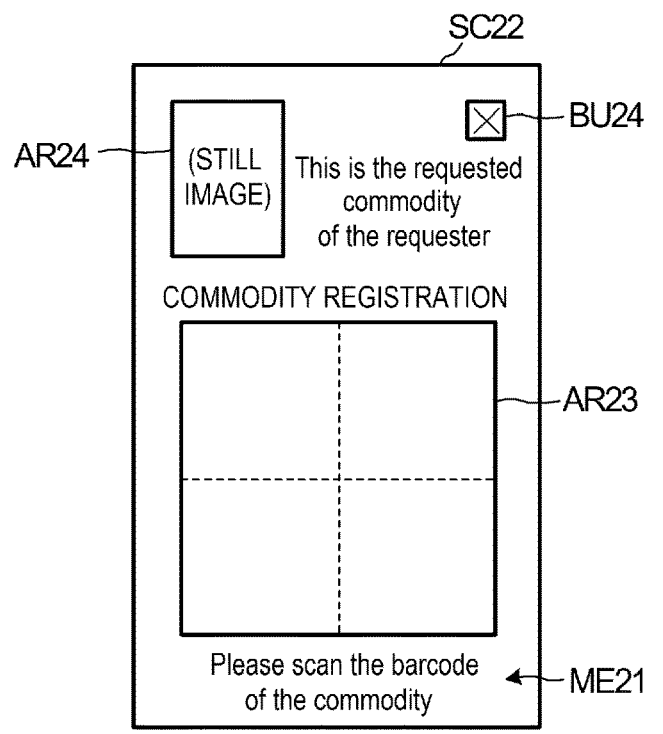
FIG. 17 depicts a registration screen displayed by a visitor terminal.

FIG. 17 depicts an example of a registration screen SC22 in the visitor terminal 2. The registration screen SC22 is a screen for reading a barcode representing a commodity code of a commodity to be registered. The registration screen SC22 includes display areas AR23 and AR24, a message ME21, and a button BU24. The display area AR23 displays an image obtained by the camera 25. The display area AR23 displays the still image displayed in the display area AR22 of the streaming screen SC21. The message ME21 is a message for instructing the visitor to scan a barcode of the commodity. The button BU24 is a soft key for stopping the scan of the commodity code.

The visitor photographs a barcode or a two-dimensional barcode on a box and a label of the commodity presumed to be designated by the specified requester or a commodity explanation tag provided in a commodity shelf on which the commodity is displayed. The processor 21 decodes the scanned commodity code, that is, reads the commodity code from the photographed image of the barcode or the two-dimensional barcode. In ACT 205, the processor 21 controls the wireless communication unit 26 to transmit scan information including the read commodity code to the relay server 3. Thereafter, in ACT 206, the processor 21 waits for a response from the relay server 3 to be received.

If determining in ACT 302 that the commodity scan request is not received from the requester terminal 1, in ACT 304, the processor 31 of the relay server 3 determines whether the scan information transmitted from the visitor terminal 2 is received by the communication unit 34. If determining that the scan information is received from the visitor terminal 2, in ACT 305, the processor 31 retrieves, from the data record DR2 of the store in the store database DB32, commodity information corresponding to the commodity code included in the scan information. In ACT 306, the processor 31 controls the communication unit 34 to transmit the retrieved commodity information to the requester terminal 1. Thereafter, the processor 31 proceeds to ACT 301.

If determining in ACT 105 that the commodity information transmitted from the relay server 3 is received, in ACT 106, the processor 11 of the requester terminal 1 switches the display of the touch panel 14 from the streaming screen SC11 to a commodity information display screen and causes the touch panel 14 to display the received commodity information. Although not particularly illustrated, the commodity information display screen includes an OK button and an NG button for selecting whether to purchase the commodity indicated by the commodity information.

The requester touches the OK button if the displayed commodity information indicates the commodity intended to be purchased. Otherwise, the requester touches the NG button. Accordingly, in ACT 107, the processor 11 determines whether an OK instruction is given through the OK button. If the OK instruction is not given, that is, an NG instruction is given through the NG button, in ACT 108, the processor 11 controls the wireless communication unit 16 to transmit NG information to the relay server 3. Thereafter, the processor 11 proceeds to ACT 101.

If determining in ACT 304 that the scan information is not received from the visitor terminal 2, in ACT 307, the processor 31 of the relay server 3 determines whether the NG information transmitted from the requester terminal 1 is received by the communication unit 34. If determining that the NG information is received from the requester terminal 1, in ACT 308, the processor 31 controls the communication unit 34 to transmit the NG information to the visitor terminal 2. Thereafter, the processor 31 proceeds to ACT 301.

If determining in ACT 206 that a response from the relay server 3 is received, in ACT 207, the processor 21 of the visitor terminal 2 determines whether the response is a registration request. If determining that the response is not the registration request, that is, the response indicates the NG information, in ACT 208, the processor 21 causes the touch panel 24 to display a re-scan request.

Figure 18:
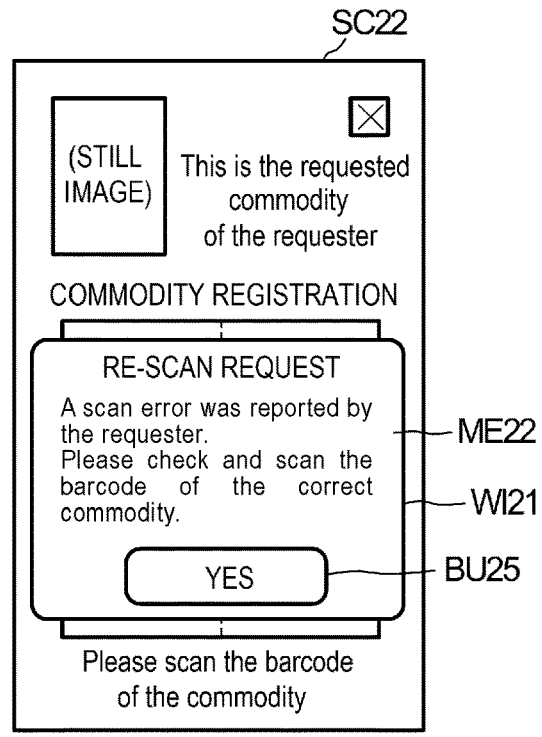
FIG. 18 depicts a re-scan request screen displayed by a visitor terminal.

FIG. 18 depicts an example of a re-scan request displayed by the visitor terminal 2. The processor 21 controls the touch panel 24 to display a display window WI21 in the registration screen SC22. The display window WI21 includes a message ME22 and a button BU25. The message ME22 is a message indicating that another commodity needs to be scanned. The button BU25 is a key for confirmation on the re-scan request.

The processor 21 proceeds to ACT 204 according to the touch operation on the button BU25 by the visitor. The visitor scans another commodity.

On the other hand, if the commodity information displayed on the requester terminal 1 indicates the commodity that the requester intends to purchase, the requester touches the OK button. In such a case, the processor 11 determines in ACT 107 that the OK instruction by the touch operation on the OK button is given. In ACT 109, the processor 11 controls the wireless communication unit 16 to transmit a registration request to the relay server 3. Thereafter, the processor 11 proceeds to ACT 101.

If determining in ACT 307 that the NG information is not received from the requester terminal 1, in ACT 309, the processor 31 of the relay server 3 determines whether the registration request transmitted from the requester terminal 1 is received by the communication unit 34. If determining that the registration request transmitted from the requester terminal 1 is received, in ACT 310, the processor 31 controls the communication unit 34 to transmit the registration request to the visitor terminal 2. Thereafter, the processor 31 proceeds to ACT 301.

If determining in ACT 207 that the registration request is received, in ACT 209, the processor 21 of the visitor terminal 2 causes the touch panel 24 to display a screen indicating the registration request. In the registration request, although not particularly illustrated, the message ME22 illustrated in FIG. 18 is only changed to a message indicating that a commodity is being purchased. The visitor who has confirmed the registration request display puts the commodity in a shopping basket as a commodity to be purchased by the requester. The visitor touches a button for declaring that the registration request is confirmed. In ACT 210, the processor 21 determines that the touch is a registration operation input for declaring registration of the commodity. Accordingly, in ACT 211, the processor 21 controls the wireless communication unit 26 to transmit registration completion to the relay server 3. Thereafter, the processor 21 proceeds to ACT 201.

If determining in ACT 309 that the registration request transmitted from the requester terminal 1 is not received, in ACT 311, the processor 31 of the relay server 3 determines whether the registration completion is received from the visitor terminal 2 by the communication unit 34. If determining that the registration completion is received from the visitor terminal 2, in ACT 312, the processor 31 registers the commodity. That is, the processor 31 generates registration data of the commodity and adds the registration data to the data record DR3 in the transaction management database DB33 corresponding to the requester. Thereafter, the processor 31 proceeds to ACT 301.

The visitor may want to check whether a commodity requested by the requester to purchase is correctly put in the shopping basket. In such a case, the visitor touches the button BU21 of the streaming screen SC21 to display the list of commodities to be purchased.

If determining in ACT 202 that the commodity scan request is not received, in ACT 212, the processor 21 of the visitor terminal 2 determines whether a browsing instruction by a touch operation on the button BU21 by the requester is given. If the browsing instruction is given, in ACT 213, the processor 21 controls the wireless communication unit 26 to transmit a visitor browsing instruction to the relay server 3. Thereafter, in ACT 214, the processor 21 waits for a commodity list transmitted from the relay server 3 to be received by the wireless communication unit 26.

If determining in ACT 311 that the registration completion is not received from the visitor terminal 2, in ACT 313 in FIG. 11, the processor 31 of the relay server 3 determines whether the visitor browsing instruction is received from the visitor terminal 2 by the communication unit 34. If determining that the visitor browsing request transmitted from the visitor terminal 2 is received, in ACT 314, the processor 31 of the relay server 3 generates a commodity list of registered commodities to be purchased by the requester. That is, the processor 31 generates the commodity list based on the data record DR3 in the transaction management database DB33 corresponding to the requester. In ACT 315, the processor 31 controls the communication unit 34 to transmit the created commodity list to the visitor terminal 2. Thereafter, in ACT 316, the processor 31 waits for a return instruction to be received from the visitor terminal 2 by the communication unit 34. Irrespective of whether the visitor browsing instruction is received from the visitor terminal 2, the processor 31 may generate the commodity list in advance based on the data record DR3 in the transaction management database DB33.

If determining in ACT 214 that the commodity list is received from the relay server 3, in ACT 215, the processor 21 of the visitor terminal 2 switches the display of the touch panel 24 to a browsing screen 23 for displaying the received commodity list.

Figure 19:
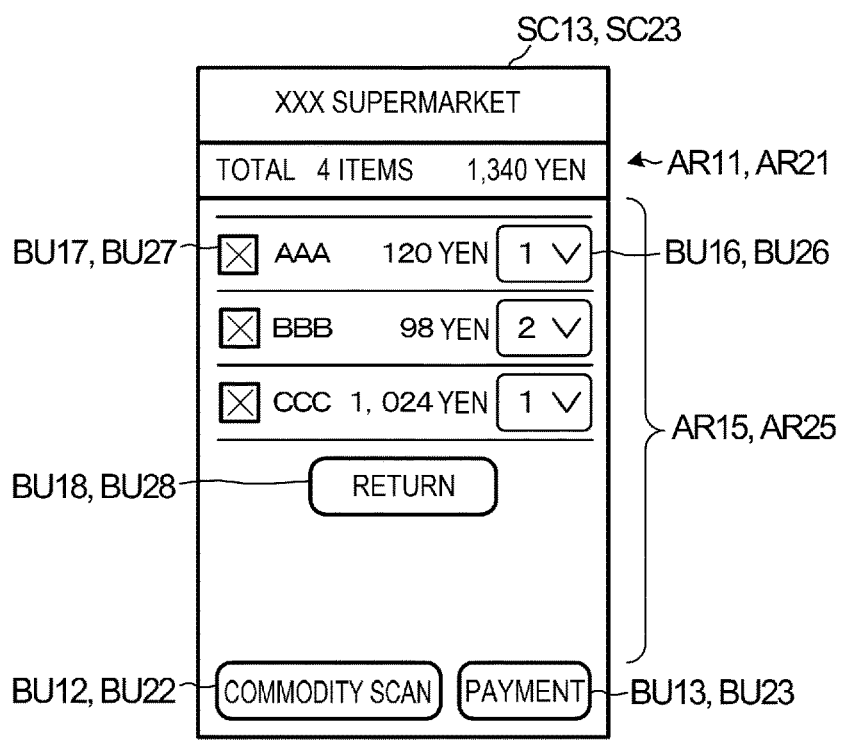
FIG. 19 depicts a browsing screen displayed by a requester terminal and a visitor terminal.

FIG. 19 depicts an example of the browsing screen SC23 in a state in which some commodities have been registered. The browsing screen SC23 includes the display area AR21 and the buttons BU22 and BU23 same as those of the streaming screen SC21. Further, the browsing screen SC23 includes a display area AR25 and buttons BU26, BU27, and BU28. The display area AR25 displays a list of registered commodities. In this example, a commodity "AAA", a price of which is 120 yen, two commodities "BBB", a price of which is 98 yen, and a commodity "CCC," a price of which is 1,024 yen, are registered. On the browsing screen SC23, the commodity names, the prices, and the numbers of items concerning these registered commodities are displayed in the display area AR25. In the display area AR21, "4" is displayed as a total number of the registered commodities and "1,340" is displayed as a total amount thereof. The buttons BU22, BU23, BU26, and BU27 on the browsing screen SC23 are dummy buttons that the user cannot operate. The button BU28 is a soft key for closing the browsing screen SC23 and returning to the streaming screen SC21.

After causing the touch panel 24 to display such a browsing screen SC23 in ACT 215, in ACT 216, the processor 21 of the visitor terminal 2 waits for a return instruction by a touch operation on the button BU28 by the visitor to be performed.

The visitor checks, based on the list of the registered commodities displayed in the display area AR25 of the browsing screen SC23, the commodities put in the shopping basket and quantities of the commodities. If the commodities stored in the shopping basket are not consistent with the listed commodities, the visitor adds or returns some of the commodities or replaces the commodities with other commodities so that the commodities in the shopping basket are consistent with the listed commodities. If the list of the registered commodities displayed in the display area AR25 and the commodities in the shopping basket coincide, the visitor touches the button BU28 of the browsing screen SC23 for returning to the streaming screen SC21.

If determining in ACT 216 that the return instruction is given by the touch operation on the button BU28 by the visitor, in ACT 217, the processor 21 controls the wireless communication unit 26 to transmit the return instruction to the relay server 3. The processor 21 proceeds to ACT 201.

If determining in ACT 316 that the return instruction is received from the visitor terminal 2 by the communication unit 34 or if the visitor browsing instruction transmitted from the visitor terminal 2 is not received in ACT 313, the processor 31 of the relay server 3 proceeds to ACT 317. In ACT 317, the processor 31 determines whether a requester browsing instruction is received from the requester terminal 1 by the communication unit 34. If determining that the requester browsing instruction is not received, the processor 31 proceeds to ACT 328.

If desiring to check registered commodities or if desiring to change the quantity of a registered commodity or cancel a registered commodity, the requester touches the button BU11 of the streaming screen SC11 to list the registered commodities. Therefore, if determining in ACT 103 that the instruction for the commodity scan is not given, in ACT 110, the processor 11 of the requester terminal 1 determines presence or absence of the browsing instruction according to presence or absence of the touch operation on the button BU11.

If the browsing instruction is given, in ACT 111 in FIG. 9, the processor 11 controls the wireless communication unit 26 to transmit the requester browsing instruction to the relay server 3. Thereafter, in ACT 112, the processor 11 waits for the commodity list transmitted from the relay server 3 to be received by the wireless communication unit 16.

If determining in ACT 317 that the requester browsing instruction transmitted from the requester terminal 1 is received, in ACT 318, as in ACT 314, the processor 31 of the relay server 3 generates a list of registered commodities. In ACT 319, the processor 31 controls the communication unit 34 to transmit the generated commodity list to the requester terminal 1.

If determining in ACT 112 that the commodity list transmitted from the relay server 3 is received, in ACT 113, the processor 11 of the requester terminal 1 switches the display of the touch panel 14 to the same browsing screen as the browsing screen SC23 in the visitor terminal 2 for displaying the received commodity list. That is, as illustrated in FIG. 19, the browsing screen SC13 includes display areas AR11 and AR15 and buttons BU12, BU13, BU16, BU17, and BU18. The display areas AR11 and AR15 and the button BU18 are the same as the display areas AR11 and AR12 and the button BU28 of the browsing screen SC23 in the visitor terminal 2. The button BU16 is a soft key for the requester to change the quantity of a registered commodity. If the requester touches the button BU16, for example, a list box for selecting numbers 1 to 20 is displayed over the button BU16 to enable the requester to input a desired quantity. The button BU17 is a soft key for the requester to cancel purchase of a registered commodity, that is, deletes registration of the commodity. The buttons BU12 and BU13 are as explained in the explanation about the streaming screen SC11.

After displaying the purchased commodity list on such a browsing screen SC13 in ACT 113, in ACT 114, the processor 11 determines whether a quantity change instruction by the touch operation on the button BU16 by the requester is given. If the quantity change instruction is given, in ACT 115, the processor 11 controls the wireless communication unit 16 to transmit a quantity change request including information concerning a commodity, the quantity of which is changed, and the quantity to be changed to the relay server 3. In ACT 116, the processor 11 waits for a completion notification to be received from the relay server 3 by the wireless communication unit 16.

After transmitting the commodity list in ACT 319, in ACT 320, the processor 31 of the relay server 3 determines whether the quantity change request is received from the requester terminal 1 by the communication unit 34. If the quantity change request is received, in ACT 321, the processor 31 controls communication unit 34 to transmit the quantity change request to the visitor terminal 2. Thereafter, in ACT 322, the processor 31 waits for the completion notification transmitted from the visitor terminal 2 to be received by the communication unit 34.

If determining in ACT 212 that the browsing instruction is not given, in ACT 218, the processor 21 of the visitor terminal 2 determines whether the quantity change request is received from the relay server 3 by the wireless communication unit 26. If the quantity change request is received, in ACT 219, the processor 21 controls the touch panel 24 to display a screen indicating the quantity change instruction. Thereafter, in ACT 220, the processor 21 waits for a completion input to be performed.

FIG. 20 depicts a quantity change instruction screen in the visitor terminal 2. The quantity change instruction screen includes a display window WI22 in the browsing screen SC23. The display window WI22 includes a message ME23 and a button BU29. The message ME23 is a message indicating, based on information concerning e commodity, the quantity of which is changed, and the quantity to be changed included in the quantity change instruction, how many pieces of which commodity are increased or reduced. The button BU29 is a soft key for the visitor to confirm the message ME23 and declaring that the visitor will deal with the changes according to the instruction.

If the button BU29 is touched, the processor 21 determines that the completion input is performed in ACT 220. In ACT 221, the processor 21 controls the wireless communication unit 26 to transmit a completion notification to the relay server 3. At this time, the processor 21 controls the touch panel 24 to display the streaming screen SC21, again. Alternatively, the processor 21 may control the touch panel 24 to display the browsing screen SC23 showing a list of registered commodities after update. However, in that case, the processor 21 needs to request the relay server 3 to transmit a commodity list after the change.

If determining in ACT 322 that the completion notification transmitted from the visitor terminal 2 is received, in ACT 323, the processor 31 of the relay server 3 updates the number of registered items of the data record DR3 of the transaction management database DB33 corresponding to the requester. That is, the processor 31 updates the quantity in registration data of the commodity and updates the total amount according to the update of the quantity. In ACT 324, the processor 31 controls the communication unit 34 to transmit a completion notification to the requester terminal 1. In ACT 323, the processor 31 can generate a commodity list after the update of the number of registered items and include the commodity list after the update in the completion notification transmitted in ACT 324.

If determining in ACT 116 that the completion notification is received from the relay server 3, in ACT 117, the processor 11 of the requester terminal 1 controls the touch panel 14 to display information indicating completion of the quantity change. Thereafter, in ACT 118, the processor 11 determines presence or absence of a return instruction by a touch operation on the button BU18. If the return instruction is not given, in ACT 119, the processor 11 further determines presence or absence of a settlement instruction by a touch operation on the button BU13. If the settlement instruction is not given, the processor 11 proceeds to ACT 114.

After transmitting the completion notification in ACT 324, in ACT 325, the processor 31 of the relay server 3 determines whether the return instruction is received from the visitor terminal 2 by the communication unit 34. If determining that the return instruction is received, the processor 31 proceeds to ACT 301. In contrast, if not receiving the return instruction, the processor 31 proceeds to ACT 320.

On the other hand, if determining in ACT 114 that the quantity change instruction is not given, in ACT 120, the processor 11 of the requester terminal 1 determines whether a deletion instruction by a touch operation on the button BU17 is given. If the deletion instruction is given, in ACT 121, the processor 11 controls the communication unit 16 to transmit a deletion request including information concerning a commodity to be deleted to the relay server 3. The processor 11 proceeds to ACT 116.

If determining in ACT 320 that the quantity change request is not received, in ACT 326, the processor 31 of the relay server 3 determines whether the deletion request is received from the requester terminal 1 by the communication unit 34. If the deletion request is received, in ACT 327, the processor 31 controls the communication unit 34 to transmit the deletion request to the visitor terminal 2. Thereafter, the processor 31 proceeds to ACT 322.

If determining in ACT 218 that the quantity change request is not received, in ACT 222, the processor 21 of the visitor terminal 2 determines whether the deletion request is received from the relay server 3 by the wireless communication unit 26. If the deletion request is received, in ACT 223, the processor 21 controls the touch panel 24 to display information indicating a deletion instruction. The deletion instruction is displayed similarly to the quantity change instruction screen illustrated in FIG. 20. Instead of the message ME23 displayed on the display window WI22, a message indicating which commodity is to be cancelled based on the information concerning the commodity included in the deletion request.

After confirmation of the message and returning the commodity in the shopping basket to the commodity shelf displaying the commodity according to the deletion instruction, the visitor touches the same button as the button BU29 on the quantity change instruction screen. Consequently, the processor 21 can determine that the completion input is performed in ACT 220.

If determining in ACT 118 that the return instruction is given, in ACT 122, the processor 11 of the requester terminal 1 controls the wireless communication unit 16 to transmit the return instruction to the relay server 3. Thereafter, the processor 11 proceeds to ACT 101.

If determining in ACT 317 that the requester browsing instruction is not received from the requester terminal 1, in ACT 328 in FIG. 12, the processor 31 of the relay server 3 determines whether a settlement request transmitted from the requester terminal 1 is received by the communication unit 34. If the settlement request is not received from the requester terminal 1, the processor 31 proceeds to ACT 301.

If determining in ACT 110 in FIG. 8 that the browsing instruction is not given, in ACT 123, the processor 11 of the requester terminal 1 determines whether the settlement instruction by a touch operation on the button BU13 of the streaming screen SC21 is given. In ACT 119 in FIG. 9, the processor 11 determines whether the settlement instruction by the touch operation on the button BU13 of the browsing screen SC23 is given. If determining in ACT 123 or ACT 119 that the settlement instruction is given, in ACT 124 in FIG. 8, the processor 11 controls the wireless communication unit 16 to transmit the settlement request to the relay server 3. Thereafter, in ACT 125, the processor 11 waits for a settlement completion notification transmitted from the relay server 3 to be received by the wireless communication unit 16.

If determining in ACT 328 that the transmission request is received from the requester terminal 1, in ACT 329, the processor 31 of the relay server 3 calculates, based on the data record DR3 of the transaction management database DB33 corresponding to the requester, total amount information including the total amounts of registered commodities for the requester and the tax amount. In ACT 330, the processor 31 executes settlement processing. The settlement processing includes processing for transmitting, with the communication unit 34, the calculated total amount to the settlement site server 4 together with the settlement method information set in the field F13 of the data record DR1 of the member database DB31 corresponding to the requester. The settlement processing includes processing for receiving, with the communication unit 34, a settlement result from the settlement site server 4. After the settlement ends, in ACT 331, the processor 31 controls the communication unit 34 to transmit the settlement completion notification to the requester terminal 1, the visitor terminal 2, and the registration device 6 of the store SH. The settlement completion notification includes, for example, a settlement completion list indicating a list of transaction numbers and purchased commodities, which are indicated in the data record DR3 of the transaction management database DB33 relating to the current transaction. In ACT 332, the processor 31 disconnects the requester terminal 1 and the visitor terminal 2.

If determining in ACT 125 that the settlement completion notification transmitted from the relay server 3 is received, in ACT 126, the processor 11 of the requester terminal 1 controls the touch panel 14 to notify of settlement completion based on the received settlement completion notification. In ACT 127, the processor 11 controls the wireless communication unit 16 to disconnect from the relay server 3.

After transmitting the completion notification to the relay server 3 in ACT 221, in ACT 224, the processor 21 of the visitor terminal 2 determines whether the settlement completion notification is received from the relay server 3 by the wireless communication unit 26. If the settlement completion notification is not received, the processor 21 proceeds to ACT 201. If the settlement completion notification is received, in ACT 225, the processor 21 controls the touch panel 24 to notify of settlement completion based on the received settlement completion notification. In ACT 226, the processor 21 controls the wireless communication unit 26 to disconnect from the relay server 3.

In ACT 601 in FIG. 15, the processor 61 of the registration device 6 of the store SH determines whether the settlement completion notification is received from the relay server 3 by the communication unit 64. If the settlement completion notification is received, in ACT 602, the processor 61 stores, in the settlement-completion-list storing section ST61, the settlement completion list included in the settlement completion notification.

Thereafter, or, if determining in ACT 601 that the settlement completion notification is not received from the relay server 3, in ACT 603, the processor 61 determines whether a new transaction is started. If determining that a transaction is not started, the processor 61 proceeds to ACT 601.

The visitor proceeds to a predetermined checkout lane in the store SH in order to take out, from the shopping basket, the commodities that have been purchased by the requester through the settlement processing. At this time, one or more unpaid commodities to be purchased by the visitor himself or herself are also stored in the shopping basket.

If determining in ACT 603 that a transaction is started, in ACT 604, the processor 61 of the registration device 6 disposed in the checkout lane receives an input of member information of the visitor. The member information can be input by a store clerk reading, with the scanner 66, a barcode indicating a member number printed on a member card presented by the visitor or displayed on the touch panel 24 of the visitor terminal 2.

The processor 61 retrieves, using the input member information, a registrant code in the settlement completion list stored in the settlement-completion-list storing section ST61. In ACT 605, the processor 61 causes the touch panel 67 and the touch panel for customer 68 to display the settlement completion list.

Thereafter, in ACT 606, the processor 61 controls the scanner 66 to scan the commodities stored in the shopping basket. In ACT 607, the processor 61 determines whether a scanned commodity is already settled by the requester. The processor 61 can determine, according to whether the commodity is included in the retrieved settlement completion list, whether the scanned commodity has already been settled. If determining that the scanned commodity has not been settled, that is, the scanned commodity is a commodity that the visitor himself or herself purchases, in ACT 608, the processor 61 registers the commodity as a commodity to be purchased by the visitor.

Thereafter, or, if determining in ACT 607 that the scanned commodity is a settled commodity, in ACT 609, the processor 61 determines whether the subtotal key of the keyboard 65 is pressed. If the subtotal key is not pressed, the processor 61 proceeds to ACT 606.

If the subtotal key is pressed, in ACT 610, the processor 61 calculates a total amount of the registered commodities to be purchased by the visitor. Thereafter, in ACT 611, the processor 61 performs settlement processing for those commodities. Thereafter, in ACT 612, the processor 61 controls the printer 610 to dispense receipts. In such a case, the processor 61 dispenses two receipts, that is, a receipt concerning the commodities purchased by the requester and a receipt concerning the commodities purchased by the visitor. For example, in response to a request for issuing an electronic receipt from the requester, the processor 61 may controls the communication unit 64 to transmit electronic receipt information to the electronic receipt server 7 instead of or in addition to the dispensing of the receipts by the printer 610.

As explained above, the commodity purchase system includes the visitor terminal 2, which is a portable terminal carried by the visitor visiting the store SH, the requester terminal 1 operated by the requester who requests the visitor to purchase a commodity, and the relay server 3, which relays communication between the visitor terminal 2 and the requester terminal 1. In the commodity purchase system, the visitor terminal 2 transmits, to the relay server 3, a transmission instruction for transmitting commodity information concerning a commodity from the relay server 3 to the requester terminal 1. The visitor terminal 2 transmits, to the relay server 3, a browsing request for requesting browsing of a list of registered commodities stored in the relay server 3. The visitor terminal 2 displays, for example, on the touch panel 24, the list of the registered commodities transmitted from the relay server 3 in response to the browsing request. The requester terminal 1 transmits, to the relay server 3, a registration request for registration of the commodity indicated by the commodity information transmitted from the relay server 3. The requester terminal 1 transmits, to the relay server 3, a browsing request for requesting browsing of the list of the registered commodities stored in the relay server 3. The requester terminal 1 displays, for example, on the touch panel 14, the list of the registered commodities transmitted from the relay server 3 in response to the browsing request. In response to the transmission instruction from the visitor terminal 2, the relay server 3 transmits the commodity information to the requester terminal 1. The relay server 3 registers the commodity corresponding to the registration request from the requester terminal 1 as a commodity to be purchased by the requester. In response to the browsing request from the requester terminal 1 or the visitor terminal 2, the relay server 3 transmits the list of registered commodities to the requester terminal 1 or the portable terminal.

Accordingly, even if the requester is present in a place physically different from the store SH, the requester can see and choose to buy a commodity as if the requester is doing shopping in a store. Registered commodities can be always checked with the requester terminal 1 and the visitor terminal 2. Accordingly, the visitor carrying the visitor terminal 2 can surely match a commodity put in the shopping basket and a commodity that the requester requests to purchase.

In the commodity purchase system, the requester terminal 1 transmits, to the visitor terminal 2, through the relay server 3, a changing request for changing the quantity of a registered commodity or a deletion request for deleting a registered commodity. The visitor terminal 2 transmits, to the relay server 3, a completion notification of changing operation or deletion operation for the commodity responding to the changing request or the deletion request. The relay server 3 applies the change or deletion of the commodity in response to the completion notification from the visitor terminal 2.

Accordingly, the requester can always change the quantity of a commodity to be purchased or cancel the purchase. Actual changes are made by the relay server 3 only after a completion notification is received from the visitor terminal. Therefore, it is less likely that discrepancy occurs between commodities stored in the shopping basket of the visitor and commodities registered by the relay server.

In the commodity purchase system, the visitor terminal 2 transmits a streaming video taken by the camera 25 to the requester terminal 1 through the relay server 3 and displays, on the touch panel 24, a designation result of a commodity in the streaming video transmitted from the requester terminal 1 through the relay server 3. The requester terminal 1 designates the commodity shown in the streaming video transmitted from the visitor terminal 2 through the relay server 3 and transmits the designation result to the visitor terminal 2 through the relay server 3. In the commodity purchase system, the visitor terminal 2 reads code information for specifying the commodity and transmits the read code information to the relay server 3. The relay server 3 transmits, to the requester terminal 1, commodity information corresponding to the code information transmitted from the visitor terminal 2.

Accordingly, if finding, in the streaming video, a commodity that the requester desires to purchase, the requester can request the visitor to purchase the commodity. The visitor can read a barcode on a box or a label of the commodity, transmit commodity information of the commodity from the relay server 3 to the requester terminal 1, and cause the requester to check the commodity information.

In the commodity purchase system, the relay server 3 relays, to the visitor terminal 2, a registration request transmitted from the requester terminal 1 and registers a commodity as a registered commodity in response to reception of a completion notification of registration operation transmitted from the visitor terminal 2 that receives the registration request.

Accordingly, the commodity requested by the requester is registered after the requester confirms the commodity with the commodity information. In other words, the requester can notice that a commodity, which is not desired to be purchased, is scanned. Therefore, it is less likely that a commodity not desired by the requester is registered as a purchased commodity.

According to the aforementioned embodiments, relay server 3 relays communication between the visitor terminal 2 and the requester terminal 1. According to a transmission instruction for transmitting, to the requester terminal 1, commodity information concerning a commodity transmitted from the visitor terminal 2, the relay server 3 transmits the commodity information to the requester terminal 1. In response to a registration request for the commodity indicated by the commodity information transmitted from the requester terminal 1, the relay server 3 registers the commodity as a registered commodity of the requester. In response to a browsing request for the registered commodity transmitted from the requester terminal 1 or the visitor terminal 2, the relay server 3 transmits a list of registered commodities to the requester terminal 1 or the visitor terminal 2.

Accordingly, even if the requester is present in a place physically different from the store SH, the requester can select and purchase a commodity as if the requester is doing shopping in a store. If requested from the requester terminal 1 or the visitor terminal 2, the relay server 3 transmits a list of registered commodities. Accordingly, by checking the list of the registered commodities, the visitor carrying the visitor terminal 2 can make sure that the commodities stored in the shopping basket are consistent with the registered commodities.

Various modifications to the aforementioned embodiments are possible.

A part or all of the functions performed by the processors 11, 21, 31, and 61 according to the information processing can also be performed by hardware such as one or more logic circuits. Each of the functions can also be performed by a combination of software and hardware such as logic circuits.

The processing in ACT 313 to ACT 316 and the processing in ACT 317 to ACT 325 can be carried out with the order of the processing changed. The processing in ACT 313 to ACT 316 and the processing in ACT 317 to ACT 325 may be carried out in parallel. The order of the processing in ACT 337 and the processing in ACT 338 may also be changed.

By using the existing image recognition technique, the processor 31 of the relay server 3 may recognize commodities in an image photographed by the camera 25 of the visitor terminal 2 and generate video data for superimposing and displaying, on a streaming video that the processor 31 causes the touch panel 14 of the requester terminal 1 to display, commodity information of a commodity reflected in the streaming video. Consequently, if the requester designates a desired commodity, the processor 31 of the relay server 3 can transmit commodity information of the commodity to the visitor terminal 2 and cause the touch panel 24 to display the commodity information. Therefore, the processor 31 can surely notifies the visitor of the desired commodity.

Since the visitor carries back commodities purchased by the requester, a reward such as a coupon or a point may be granted to the visitor.

The commodities purchased by the requester may be arranged to be delivered by the store SH. In such case, since a delivery charge is separately incurred, the processor 31 of the relay server 3 may add the delivery charge in calculating the total amount for performing electronic settlement of the purchased commodities of the requester.

The several embodiments are explained above. However, these embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A commodity purchase system for assisting a customer who is not at a store in making purchase, the system comprising:
    a relay server;
    a first terminal configured to capture an image of one or more commodities displayed in a store and output the image; and
    a second terminal configured to display the image received via the relay server, detect a user selection operation made on the displayed image, and issue a scan request with positional information indicating a position in the displayed image at which the user selection operation has been made, wherein
    the first terminal is further configured to:
        upon receipt of the scan request via the relay server, based on the positional information, display the image on which the user selection operation has been made with the position being marked, and
        scan one of the commodities for registration and transmit, to the relay server, commodity information about said one of the commodities, and
    the relay server is further configured to, based on the received commodity information, register said one of the commodities as a commodity to be purchased by a customer.

2. The commodity purchase system according to claim 1, wherein
    the relay server stores data of one or more commodities to be purchased by the customer,
    the first terminal is further configured to transmit to the relay server a request for a list of the commodities to be purchased by the customer, and
    the relay server is further configured to, in response to the request for the list, transmit the list to the first terminal.

3. The commodity purchase system according to claim 1, wherein
    the relay server stores data of one or more commodities that have been registered for the customer,
    the second terminal is further configured to transmit to the relay server a request for a list of the registered commodities, and
    the relay server is further configured to, in response to the request for the list, transmit the list to the second terminal.

4. The commodity purchase system according to claim 1, wherein
    the relay server is further configured to, upon receipt of the commodity information about said one of the commodities from the first terminal, before registering said one of the commodities, transmit the commodity information to the second terminal, and
    the second terminal is further configured to display the commodity information.

5. The commodity purchase system according to claim 4, wherein
    the second terminal is further configured to, after displaying the commodity information, transmit a request to register said one of the commodities to the first terminal via the relay server,
    the first terminal is configured to, upon input of an operation after the request is received, transmit a completion notification to the relay server, and
    the relay server registers said one of the commodities upon receipt of the completion notification.

6. The commodity purchase system according to claim 4, wherein
    the second terminal is further configured to, after displaying the commodity information, transmit a request to not register said one of the commodities to the first terminal via the relay server, and
    the first terminal is further configured to, upon receipt of the request, display a message requesting for scanning of another commodity.

7. The commodity purchase system according to claim 1, wherein
    the relay server stores data of one or more commodities to be purchased by the customer and one or more commodities that have been registered for the customer,
    the second terminal is further configured to transmit, to the first terminal via the relay server, a request for changing a quantity of a commodity to be purchased or cancelling registration of a commodity that has been registered,
    the first terminal is further configured to, upon receipt of the request, display a screen including a message instructing adding or returning the commodity and a button for confirmation, and
    the relay server is further configured to, when the button is operated, update the data to change the quantity of the commodity or cancel the registration of the commodity.

8. The commodity purchase system according to claim 1, wherein the image is continuously captured and streamed to the second terminal via the relay server.

9. The commodity purchase system according to claim 1, further comprising:
    a registration device installed in the store and configured to:
        scan one or more commodities for registration,
        determine whether each of the scanned commodities is a commodity that has already been registered by the relay server, and
        perform settlement processing only on the scanned commodities that have not been registered by the relay server.

10. The commodity purchase system according to claim 1, wherein the relay server stores an identification code of the customer in association with an identification code of another customer using the first terminal in the store.

11. A relay server in a commodity purchase system for assisting a customer who is not at a store in making purchase, the relay server comprising:
- a network interface configured to communicate with a first terminal and a second terminal, the first terminal being configured to capture an image of one or more commodities displayed in a store and output the image; and
- a processor configured to:
  - relay the image from the first terminal to the second terminal and cause the second terminal to display the image,
  - upon receipt of a scan request with positional information indicating a position in the image from the second terminal, control the network interface to forward the scan request to the first terminal, and
  - upon notification of completion of scanning of one of the commodities in the image by the first terminal, acquire commodity information about said one of the commodities and register said one of the commodities as a commodity to be purchased by a customer.

12. The relay server according to claim 11, further comprising:
- a memory that stores data of one or more commodities to be purchased by the customer, wherein
- the processor is further configured to, upon receipt of a request from the first terminal, control the network interface to transmit a list of the commodities to be purchased by the customer to the first terminal.

13. The relay server according to claim 11, further comprising:
- a memory that stores data of one or more commodities that have been registered for the customer, wherein
- the processor is further configured to, upon receipt of a request from the second terminal, control the network interface to transmit a list of the registered commodities to the second terminal.

14. The relay server according to claim 11, wherein the processor is further configured to, after acquiring the commodity information about said one of the commodities and before registering the commodity, control the network interface to transmit the commodity information to the second terminal and cause the second terminal to display the commodity information.

15. The relay server according to claim 14, wherein the processor is further configured to:
- upon receipt of a request to register said one of the commodities from the second terminal that has displayed the commodity information, relay the request to the first terminal, and
- upon receipt of a completion notification from the first terminal in response to the request, register said one of the commodities.

16. The relay server according to claim 14, wherein the processor is further configured to, upon receipt of a request to not register said one of the commodities from the second terminal that has displayed the commodity information, relay the request to the first terminal and cause the first terminal to display a message requesting for scanning of another commodity.

17. The relay server according to claim 11, further comprising:
- a memory that stores data of one or more commodities to be purchased by the customer and one or more commodities that have been registered for the customer, wherein
- the processor is further configured to, upon receipt of a request for changing a quantity of a commodity to be purchased or cancelling registration of a commodity that has been registered from the second terminal, cause the first terminal to display a screen including a message instructing adding or returning the commodity and a button for confirmation, and
- when the button is operated, update the data to change the quantity of the commodity or cancel the registration of the commodity.

18. The relay server according to claim 11, wherein the processor is further configured to continuously stream the image captured by the first terminal to the second terminal.

19. The relay server according to claim 11, further comprising:
- a memory that stores an identification code of the customer in association with an identification code of another customer using the first terminal in the store.

20. A method performed by a server in a commodity purchase system for assisting a customer who is not at a store in making purchase, the method comprising:
- relaying an image of one or more commodities displayed in a store and captured by a first terminal to a second terminal and causing the second terminal to display the image;
- upon receipt of a scan request with positional information indicating a position in the image from the second terminal, forwarding the scan request to the first terminal; and
- upon notification of completion of scanning of one of the commodities by the first terminal, acquiring commodity information about said one of the commodities and registering said one of the commodities as a commodity to be purchased by a customer.

* * * * *